United States Patent
Zhang et al.

(10) Patent No.: US 11,263,708 B2
(45) Date of Patent: Mar. 1, 2022

(54) SYSTEM, METHOD, COMPUTER PROGRAM AND DATA SIGNAL FOR SCHEDULING AT LEAST ONE PHYSICAL EVENT

(71) Applicant: Macau University of Science and Technology, Taipa (MO)

(72) Inventors: Si Wei Zhang, Taipa (MO); Nai Qi Wu, Taipa (MO); Zhi Wu Li, Taipa (MO)

(73) Assignee: Macau University of Science and Technology, Taipa (MO)

( * ) Notice: Subject to any disclaimer, the term of this patent is extended or adjusted under 35 U.S.C. 154(b) by 415 days.

(21) Appl. No.: 15/396,992

(22) Filed: Jan. 3, 2017

(65) Prior Publication Data

US 2018/0189897 A1  Jul. 5, 2018

(51) Int. Cl.
*G06Q 50/04*  (2012.01)
*G06Q 10/06*  (2012.01)

(52) U.S. Cl.
CPC ....... *G06Q 50/04* (2013.01); *G06Q 10/06313* (2013.01); *Y02P 90/30* (2015.11)

(58) Field of Classification Search
None
See application file for complete search history.

(56) References Cited

U.S. PATENT DOCUMENTS

2014/0128996 A1* 5/2014 Sayyarrodsari ........ G05B 17/02
                                                    700/29
2016/0231993 A1* 8/2016 Pereira ...................... G06F 8/35

FOREIGN PATENT DOCUMENTS

AU    2015101560 A4 *  11/2015  ......... G06Q 10/0631

OTHER PUBLICATIONS

NaiQi Wu et al., Hybrid Petri Net Modeling and Schedulability Analysis of High Fusion Point Oil Transportation Under Tank Grouping Strategy for Crude Oil Operations in Refinery, IEEE Transactions on Systems, Man, and Cybernetics—Part C: Applications and Reviews. vol. 40, No. 2, Mar. 2010.*
NaiQi Wu et al., Hybrid Petri Net Modeling and Schedulability Analysis of High Fusion Point Oil Transportation Under Tank Grouping Strategy for Crude Oil Operations in Refinery, IEEE Transactions on Systems, Man, and Cybernetics—Part C: Applications and Reviews. vol. 40, No. 2, Mar. 2010 (Year: 2010).*
D. C. Cafaro and J. Cerda, "Dynamic scheduling of multiproduct pipelines with multiple delivery due dates", Computers & Chemical Engineering, vol. 32, pp. 728-753, 2008.

(Continued)

*Primary Examiner* — Jerry O'Connor
*Assistant Examiner* — Matthew H Divelbiss
(74) *Attorney, Agent, or Firm* — Renner Kenner Greive Bobak Taylor & Weber (57) ABSTRACT

A system and method for scheduling at least one event includes a component module arranged to receive component data regarding a plurality of possible operation decisions, a modelling module arranged to utilise the plurality of operation decisions to construct a Petri net model to simulate a real world system, a scheduling module arranged to utilise the Petri net and variable data regarding the plurality of operation decisions to determine a schedule of events that is feasible subject to a set of predetermined constraints, and an operation module arranged to provide the schedule of events to at least one external device.

14 Claims, 6 Drawing Sheets

(56) References Cited

OTHER PUBLICATIONS

H. X. Chen and H.-M. Hanisch, "Analysis of hybrid systems based on hybrid net condition/event system model", Discrete Event Dynamic Systems—Theory and Applications, vol. 11, pp. 163-185, 2001.

R. David and H. Alla, "On hybrid Petri nets", Discrete Event Dynamic Systems—Theory and Applications, vol. 11, pp. 9-40, 2001.

C. A. Floudas and X. Lin, "Continuous-time versus discrete-time approaches for scheduling of chemical processes: a review", Computers & Chemical Engineering, vol. 28, pp. 2109-2129, 2004.

K. Glismann and G. Gruhn, "Short-term scheduling and recipe optimization of blending processes", Computers & Chemical Engineering, vol. 25, pp. 627-634, 2001.

S. Honkomp, S. Lombardo, O. Rosen, and J. Pekny, "The curse of reality—why process scheduling optimization problems are difficult in practice", Computers & Chemical Engineering, vol. 24, pp. 323-328, 2000.

Y. Hou, N. Q. Wu, M. C. Zhou, and Z. W. Li, "Pareto-optimization for scheduling of crude oil operations in refinery via genetic algorithm", IEEE Transactions on Systems, Man, & Cybernetics: Systems, pp. 2168-2216, 2015.

Z. Jia, M. Ierapetritou, and J. D. Kelly, "Refinery short-term scheduling using continuous time formulation: Crude-oil operations", Industrial & Engineering Chemistry Research, vol. 42, pp. 3085-3097, 25 2003.

Z. Jia and M. Ierapetritou, "Efficient short-term scheduling of refinery operations based on a continuous time formulation", Computers & Chemical Engineering, vol. 28, pp. 1001-1019, J 2004. R.

R. Karuppiah, K. C. Furman, and I. E. Grossmann, "Global optimization for scheduling refinery crude oil operations", Computers & Chemical Engineering, vol. 32, pp. 2745-2766, 2008.

J.-S. Lee, M. Zhou, and P.-L. Hsu, "Multiparadigm modeling for hybrid dynamic systems using a Petri net framework", IEEE Transactions on Systems, Man, and Cybernetics, Part A: Systems and Humans, vol. 38, pp. 493-498, 2008.

W. K. Li, W. H. Chi, and B. Hua, "Scheduling crude oil unloading, storage, and processing", Industrial and Engineering Chemistry Research, vol. 41, 6723-6734, 2002.

C. A. Mendez, J. Cerda, I. E. Grossmann, I. Harjunkoski, and M. Fahl, "State-of-the-art review of optimization methods for short-term scheduling of batch processes", Computers & Chemical Engineering, vol. 30, pp. 913-946, 2006.

L. F. L. Moro, "Process technology in the petroleum refining industry—current situation and future trends," Computers & Chemical Engineering, vol. 27, pp. 1303-1305, 2003.

S. Mouret, I. E. Grossmann, and P. Pestiaux, "Tightening the Linear Relaxation of a Mixed Integer Nonlinear Program Using Constraint Programming", in Integration of AI and OR Techniques in Constraint Programming for Combinatorial Optimization Problems, vol. 5547, W.-J. Hoeve and J. Hooker, Eds., Springer Berlin Heidelberg, pp. 208-222, 2009.

S. Mouret, I. E. Grossmann, and P. Pestiaux, "Time representations and mathematical models for process scheduling problems", Computers and Chemical Engineering, vol. 35, No. 6, 1038-1063, 2011.

J. M. Pinto, M. Joly, and L. F. L. Moro, "Planning and scheduling models for refinery operations", Computers & Chemical Engineering, vol. 24, pp. 2259-2276, 2000.

N. Shah, "Mathematical programming techniques for crude oil scheduling", Computers & Chemical Engineering, vol. 20, pp. S1227-S1232, 1996.

N. K. Shah, Z. Li, and M. G. Ierapetritou, "Petroleum refining operations: key issues, advances, and opportunities", Industrial and Engineering Chemistry Research, vol. 50, 1161-1170, 2011.

D. E. Shobrys and D. C. White, "Planning, scheduling and control systems: why cannot they work together", Computers & Chemical Engineering, vol. 26, pp. 149-160, Feb. 15, 2002.

M. Silva and L. Recalde, "Petri nets and integrality relaxations: A view of continuous Petri net models", IEEE Transactions on Systems, Man, and Cybernetics, Part C: Applications and Reviews, vol. 32, No. 4, pp. 314-327, 2002.

N. Q. Wu, "Necessary and sufficient conditions for deadlock-free operation in flexible manufacturing systems using a colored Petri net model", IEEE Trans. on Systems, Man, and Cybernetics, Part C, vol. 29, No. 2, pp. 192-204, 1999.

N. Wu, M. Zhou, and F. Chu, "Short-term scheduling for refinery process: Bridging the gap between theory and applications", International journal of intelligent control and systems, vol. 10, No. 2, pp. 162-174, 2005.

N. Wu, L. Bai, and C. Chu, "Modeling and conflict detection of crude oil operations for refinery process based on controlled colored timed Petri net", IEEE Transactions on Systems, Man, and Cybernetics, Part C: Applications and Reviews, vol. 37, No. 4, pp. 461-472, 2007.

N. Wu, M. Zhou, and F. Chu, "A Petri Net-Based Heuristic Algorithm for Realizability of Target Refining Schedule for Oil Refinery", IEEE Transactions on Automation Science and Engineering, vol. 5, , No. 4, pp. 661-676, 2008.

N. Wu, F. Chu, C. Chu, and M. Zhou, "Short-Term Schedulability Analysis of Crude Oil Operations in Refinery With Oil Residency Time Constraint Using Petri Nets", IEEE Transactions on Systems, Man, and Cybernetics, Part C: Applications and Reviews, vol. 38, No. 6, pp. 765-778, 2008.

N. Wu, F. Chu, C. Chu, and M. Zhou, "Short-Term Schedulability Analysis of Multiple Distiller Crude Oil Operations in Refinery With Oil Residency Time Constraint," IEEE Transactions on Systems, Man, and Cybernetics, Part C: Applications and Reviews, vol. 39, No. 1, pp. 1-16, 2009.

N. Q. Wu, F. Chu, C. B. Chu, and M. C. Zhou, "Hybrid Petri net modeling and schedulability analysis of high fusion point oil transportation under tank grouping strategy for crude oil operations in refinery", IEEE Transactions on Systems, Man, and Cybernetics, Part C, vol. 40, No. 2, 159-175, 2010.

N. Q. Wu, F. Chu, C. B. Chu, and M. C. Zhou, Tank cycling and scheduling analysis of high fusion point oil transportation for crude oil operations in refinery, Computers & Chemical Engineering, vol. 34, pp. 529-543, 2010.

N. Wu, C. Chu, F. Chu, and M. Zhou, "Schedulability Analysis of Short-Term Scheduling for Crude Oil Operations in Refinery With Oil Residency Time and Charging-Tank-Switch-Overlap Constraints", IEEE Transactions on Automation Science and Engineering, vol. 8, No. 1, pp. 190-204, 2011.

N. Q. Wu, L. P. Bai, M. C. Zhou, F. Chu, and S. Mammar, "A novel approach to optimization of refining schedules for crude oil operations in refinery", IEEE Transactions on Systems, Man, & Cybernetics, Part C, vol. 42, No. 6, 1042-1053, 2012.

N. Q. Wu, M. C. Zhou, and Z. W. Li, "Short-term scheduling of crude-oil operations: Petri net-based control—theoretic approach", IEEE Robotics and Automation Magazine, vol. 22, No. 2, pp. 64-76, 2015.

N. Q. Wu, M. C. Zhou, L. P. Bai, and Z. W. Li, "Short-term scheduling of crude oil operations in refinery with high fusion point oil and two transportation pipelines", Enterprise Information Systems, vol. 10, No. 6, pp. 581-610, 2016.

N. Q. Wu, L. P. Bai, and M. C. Zhou, "An efficient scheduling method for crude oil operations in refinery with crude oil type mixing requirements", IEEE Transactions on Systems, Man, & Cybernetics: Systems, vol. 46, No. 3, pp. 413-426, 2016.

U. Yuzgec, A. Palazoglu, and J. A. Romagnoli, "Refinery scheduling of crude oil unloading, storage and processing using a model predictive control strategy", Computers & Chemical Engineering, vol. 34, pp. 1671-1686, 2010.

\* cited by examiner

SYSTEM, METHOD, COMPUTER PROGRAM AND DATA SIGNAL FOR SCHEDULING AT LEAST ONE PHYSICAL EVENT

TECHNICAL FIELD

The present invention relates generally to a system, method, computer program and data signal for scheduling at least one physical event.

Embodiments of the invention find particular, but not exclusive, use in the area of scheduling the transport of crude oil in a manner which optimises tank usage (i.e. which provides "least tank requirement").

The present invention also has application in the area of space optimisation generally.

BACKGROUND

Oil continues to be a central and crucial energy resource for the world and oil refineries continue to play a crucial role in society. It is known that a well operated plant can increase the profit by $10 for every ton of products produced.

A plant is operated hierarchically with three levels: production planning at the higher level, production scheduling at the middle level, and process control at the lower level. For production planning at the higher level, an optimal plan can be pursued for the whole refinery by using commercial software tools that are developed based on linear programming techniques. For process control at the lower level, the implementation of advanced control systems for unit control results in a productivity increase for devices. However, the productivity optimization of production units does not imply global profit optimization of the plant.

To optimize a plant correctly, effective techniques for short-term scheduling at the middle level are necessary such that the three levels of operation can be integrated.

The short-term scheduling problem is one of the most difficult ones for operating an oil refinery and, up to now, no effective technique and/or software has been developed. This job is currently performed manually in a trial and error way.

While some attempts have been made to make the short-term scheduling problem of oil refineries solvable, such models have often disregarded physical and "real world" constraints, which leads to the creation of an infeasible schedule.

Real world constraints may include (for example) the number of charging tanks in the oil refinery system. Most conventional setups require three charging tanks for each distiller. However, in some real world oil refineries, the number of available charging tanks for a scheduling horizon may be less than the number required by the conditions. For instance, one oil refinery in China installed an additional distiller to extend their production capacity but did not change the number of charging tanks, leading to a situation where the charging tanks became the bottleneck for the system. Such real world constraints make the development of a workable (and flexible) model more difficult.

It is with this background in mind that the embodiments of the invention and the broader inventive concept have been developed.

SUMMARY OF THE INVENTION

In a first aspect, the present invention provides a system for scheduling at least one event, comprising a component module arranged to receive component data regarding a plurality of possible operation decisions, a modelling module arranged to utilise the plurality of operation decisions to construct a petri net model to simulate a real world system, and a scheduling module arranged to utilise the Petri net and variable data regarding the plurality of operation decisions to determine a schedule of events that is feasible subject to a set of predetermined constraints, and an operation module arranged to provide the schedule of events to at least one external device.

Preferably, the schedule of events is optimised via use of an optimisation algorithm.

In one embodiment, the operation decisions include a subset of variables which describe physical components and/or physical characteristics of a real world system.

Preferably, the operation decisions are directed to the operation of an oil refinery.

In one embodiment, the physical characteristics of the real world system include the oil type, the device from which oil is received, the device where oil goes and the amount of oil to be processed.

In one embodiment, the physical components include a storage tank, a pipeline, a charging tank and a distiller.

The optimisation algorithm may comprise modelling discrete physical components by providing constraints that determine how each discrete physical component operates.

In one embodiment, the optimisation algorithm comprises modelling discrete physical characteristics by providing constraints that determine how each discrete physical component operates.

The Petri net may be a hybrid discrete-continuous Petri net.

In a second aspect, the present invention provides a method for scheduling at least one event, comprising the steps of receiving component data regarding a plurality of possible operation decisions, utilising the plurality of operation decisions to construct a Petri net model to simulate a real world system, and utilising the Petri net and variable data regarding the plurality of operation decisions to determine a schedule of events that is feasible subject to a set of predetermined constraints.

In a third aspect, the present invention provides a computer program incorporating at least one instruction, arranged to, when executed on a computing system, perform the method steps in accordance with the second aspect of the invention.

In a fourth aspect, the present invention provides a data signal encoding at least one instruction, arranged to, when received and executed on a computing system, perform the method steps in accordance with the second aspect of the invention.

In a fifth aspect, the present invention provides an oil refinery incorporating a system in accordance with the first aspect of the invention, wherein the at least one device includes a physical component which operates at least one aspect of the oil refinery.

BRIEF DESCRIPTION OF DRAWINGS

The invention is now discussed with reference to drawings, where.

DETAILED DESCRIPTION OF THE INVENTION

The present invention relates generally to a system, method, computer program and data signal for the scheduling of an event and/or action or scheduling a series of events and/or actions. The embodiments described herein are described with reference to the scheduling of the transport of crude oil. However, it will be appreciated that the system, method computer program and data signal has application in other analogous areas.

It is instructive to understand how oil refineries typically operate, as this has an effect on the types of restraints that need to be built into any scheduling system. It will be understood that the forgoing description is provided as an example of the types of constraints that typically affect an oil refinery. However, no gloss should be taken from the examples provided herein to limit or otherwise read down the broader inventive concept. These constraints are provided for illustrative purposes only.

In a typical oil refinery, there are storage tanks for crude oil storage and also charging tanks for distiller feeding. Often storage tanks are located by the sea (to allow tankers to be easily filled) with a distance of tens of kilometers from the finery plant. Generally, a pipeline is used to transport crude oil from the storage tanks to the charging tanks. Crude oil purchased from oil fields arrives by sea via crude oil tankers and is unloaded into storage tanks. Via the pipeline, the oil in the storage tanks is delivered into charging tanks and is then fed into distillers. The process from unloading oil from tankers to feeding oil to distillers forms crude oil operations.

A refinery purchases crude oil from a number of oil fields. The oil received from each oil field is different and therefore the crude distillation process will vary for each "batch" of oil. As such, oil from different fields is not mixed in the same tank. That is, a tank does not typically hold more than one type of oil at any given time. Thus, in the process of a tanker unloading, oil is always placed into an empty storage tank or a tank with the same type of oil in it.

The same constraints occur when oil is delivered into a charging tank from a storage tank via a pipeline. Although a pipeline can be in an idle state for some time, it is generally full of oil. In delivering oil from storage tanks to charging tanks, the pipeline needs to switch from one type of oil to another. Hence, in a pipeline, there may be several segments which each contain a different oil type. Note that different oil types can be mixed when oil is delivered from storage tanks to charging tanks. However, a mixture of different types of oil can be treated as another type of oil.

In the ensuing description, a number of constraints are assumed for all crude oil operations and these constraints inform the algorithms embedded in the software and hardware in accordance with an embodiment of the invention:

1. The oil types and their amounts usable during a scheduling horizon are those initially available in the tanks and pipelines, and those that arrive via tankers during the scheduling horizon;

2. Only the available storage and charging tanks can be used and the capacity of each tank is limited;

3. The flow rates for oil transportation via a pipeline and oil feeding for a distiller should be in an allowable range;

4. It is not allowable to charge and discharge a tank at the same time;

5. The operation of a distiller should not be interrupted at any time during the scheduling horizon except a planned maintenance; and 6. After filling a tank, there is an oil residency time constraint that requires that the oil should stay there for a given time before it can be discharged.

Based on the above constraints (1 through 6) an algorithm and model, which is encoded in software, has been developed which addresses these constraints and provides a workable 'real world' scheduling system which can be used to control an automated or semi-automated scheduling system to operate an oil refinery.

Figure 1:
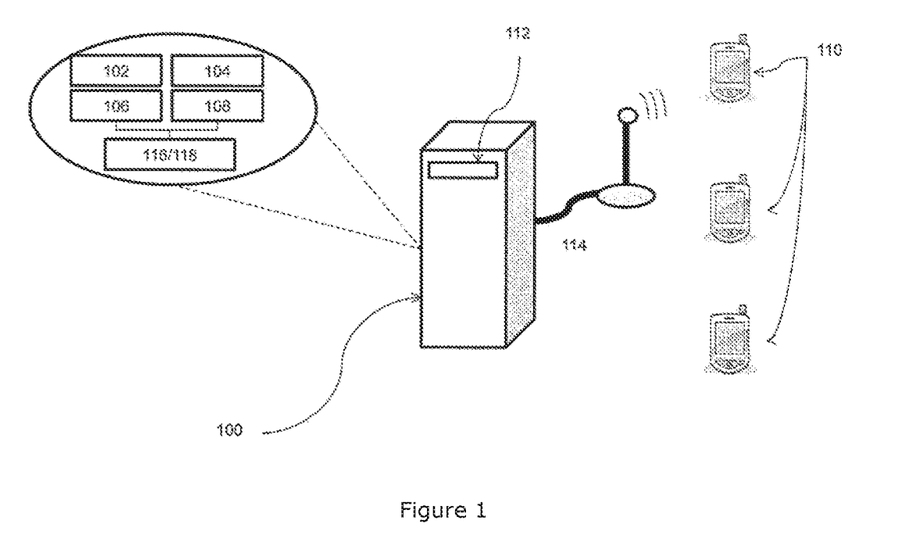
FIG. 1 is a schematic diagram illustrating a system in accordance with an embodiment of the present invention.

In FIG. 1 there is shown a schematic diagram of a computing system, which in this embodiment is a server 100 suitable for use with an embodiment of the present invention. The server 100 may be used to execute application and/or system services such as a system and method for the scheduling of various operations in accordance with an embodiment of the present invention.

With reference to FIG. 1, the server 100 may comprise suitable components necessary to receive, store and execute appropriate computer instructions. The components may include a processor 102, read only memory (ROM) 104, random access memory (RAM) 106, an input/output devices such as disc drives 108, remote or connected input devices 110 (such as a mobile computing device, a smartphone or a 'desktop' personal computer), and one or more communications link(s) 114.

The server 100 includes instructions that may be installed in ROM 104, RAM 106 or disc drives 112 and may be executed by the processor 102. There may be provided a plurality of communication links 114 which may variously connect to one or more computing devices 110 such as servers, personal computers, terminals, wireless or handheld computing devices, or mobile communication devices such as a mobile (cellular) telephone. At least one of a plurality of communications link 114 may be connected to an external computing network through a telecommunications network.

In one particular embodiment the device may include a database 116 which may reside on the storage device 112. It will be understood that the database may reside on any suitable storage device, which may encompass solid state drives, hard disc drives, optical drives or magnetic tape drives. The database 116 may reside on a single physical storage device or may be spread across multiple storage devices.

The server 100 includes a suitable operating system 118 which may also reside on a storage device or in the ROM of the server 100. The operating system is arranged to interact with the database and with one or more computer programs to cause the server to carry out the steps, functions and/or procedures in accordance with the embodiments of the invention described herein.

Broadly, the invention relates to a computing method and system arranged to interact with one or more remote devices via a communications network. The remote devices may take the form of other computing devices, as described above, but may also take the form of electronically operated devices, such as valves, hatches, pumps, etc. as will be described in more detail later.

Other aspects of the broad inventive concept relate to a corresponding method, computer program and data signal. The method facilitates the scheduling of operations and the subsequent performance of such operations, by the use of a communications network which allows commands or data to send between one or more remote devices and one or more databases.

In order to describe the underlying algorithms and processes which operate the scheduling system, it is instructive to begin by defining some variables which represent various components within an oil refinery system. The ensuing paragraphs describe a mathematical model which underpins the software system described above. It will be understood that the ensuing mathematical model is described by reference to mathematical equations in order to provide the skilled addressee with the best mode for the embodiment. While abstract mathematical concepts are described in order to fully describe the inventive concept, the broader inventive concept is not an "abstract idea" but is reduced to practice by being encoded in a software application which operates on a computing system, which in turn operates a semi-automated or fully automated oil refinery. Therefore, the ensuing description is to be read in the context of a physical system.

Returning to the system, it is firstly helpful to define an operation decision as $OD=(COT, S, D, V_{(S, D)}, INT=[\tau_s, \tau_e])$, where COT denotes the oil type to be processed; S the device where the oil comes from; D the device where the oil goes to; $V_{(S, D)}$ the amount of oil to be processed; and INT the time duration of the OD with $\tau_s$ and $\tau_e$ being the start and end time, respectively.

The device the oil comes from, S, maybe a tanker, a storage tank, a pipeline, and a charging tank, while the device the oil goes to, D, can be a storage tank, a pipeline, a charging tank, and a distiller.

In addition, to allow for a complex system with multiple components, K denotes the set of tanks, $K_i$ denotes Tank i, and $Cap(K_i)$ and $V(K_i)$ the capacity of $K_i$ and oil volume in $K_i$, respectively. Further, SK and CK denote the sets of storage and charging tanks, respectively, and DT the set of distillers.

For the purposes of the system (which is generally true in a real world situation in any event), the oil flow rate for an OD is scheduled to be a constant in practice and is determined as $f=V_{(S, D)}/(\tau_e-\tau_s)$.

For crude oil operations, there are three types of operational decisions (ODs)

1. crude oil unloading from a tanker (S) to a storage tank (D), denoted ODU 2. crude oil delivering from a storage tank (S) to a charging tank (D) by using a pipeline, denoted ODT and 3. crude oil feeding from a charging tank (S) to a distiller (D) denoted ODF.

Respectively, the time durations for ODU, ODT, and ODF are denoted as $[\tau_{us}, \tau_{ue}]$, $[\tau_{ts}, \tau_{te}]$, and $[\tau_{fs}, \tau_{fe}]$. The flow rates for the three ODs are denoted as $f_{ODU}=V_{ODU}/(\tau_{ue}-\tau_{us})$, $f_{ODT}=f_{pm}=V_{(i, j)}/(\tau_{te}-\tau_{ts})$, and $f_{ODF}=V_{j,k}/(\tau_{fe}-\tau_{fs})$, respectively, where $V_{ODU}$ is the oil volume for an ODU, $f_{pm}$ is the flow rate of a pipeline and $V_{(i, j)}$ is the oil volume transported from Storage Tank i to Charging Tank j for an ODT, and $V_{(j, k)}$ is the oil volume fed into Distiller k from Charging Tank j.

Based on the definitions above and given a scheduling horizon $\Gamma=[\tau_{start}, \tau_{end}]$ with $\tau_{start}$ and $\tau_{end}$ being the start and end time, and initial state information, the short-term scheduling problem is to determine an ordered set of ODs $\{ODU_1, ODU_2, \ldots, ODU_x, ODT_1, ODT_2, \ldots, OTU_y; ODF_1, ODF_2, \ldots, ODF_z\}$ such that all constraints are satisfied and a majority of objectives are optimized.

The initial state information specifies tanker arrival information including arrival time and oil types and volume being carried, oil inventory in storage and charging tanks, and in pipelines and operation state of devices.

As above discussed, a short-term schedule is an ordered set of ODs and the process of a refinery is continuous. In the context of the broader inventive concept and the system described herein, an OD is a control command and its execution transfers the system state from one to another (e.g. opens a valve, closes a valve, etc).

Assume that, for a given scheduling horizon $\Gamma_1=[\tau_0, \tau_1]$, the initial state is $Z_0$ and a short-term schedule is found and is denoted as $SCH_1$ such that all constraints are satisfied during $\Gamma_1$. By executing $SCH_1$, state $Z_1$ is reached. Then, by starting from $Z_1$, one needs to schedule the system for $\Gamma_2=[\tau_1, \tau_2]$ with $\tau_2>\tau_1$. However, a schedule $SCH_2$ that satisfies all constraints for $\Gamma_2$ may not be physically (or mathematically) possible. In this case, $Z_1$ is referred to as an unsafe state.

A state $Z_i$ at time $\tau_i$ can be considered safe, if, by starting from $Z_i$ at $\tau_i$, a feasible schedule can be found for $\Gamma=[\tau_i, \infty]$. Then, a schedule SCH, starting from $Z_{i-1}$ is said to be feasible if after SCH, is executed state $Z_i$ is reached such that $Z_i$ is safe. With this concept of schedule feasibility, less restrict schedulability conditions can be developed.

Figure 2:
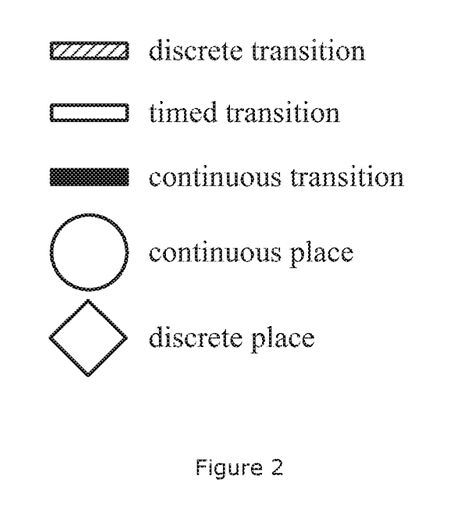
FIG. 2 is a diagram illustrating a series of icons utilised in subsequent Figures to model a Petri Net in accordance with an embodiment of the invention.

Using the variables and nomenclature, along with the framework discussed above for studying the scheduling problem, a model is built to describe the hybrid system behavior using a Petri Net, an example of which is shown in FIG. 2.

The Petri net (PN) model developed is obtained by extending the resource-oriented Petri nets (ROPN). It is a colored-timed PN (CTPN) defined as $CTPN=(P=P_D \cup P_C, T=T_D \cup T_T \cup T_C, I, O, \phi, M_0)$ where $P_D$ and $P_C$ denote sets of discrete and continuous places; $T_D$, $T_T$ and $T_C$ denote sets of discrete, timed, and continuous transitions; I and O present the input and output relations between places and transitions; $\phi$ is a set of colors representing different oil types with $\phi(p)$ and $\phi(t)$ being color sets of P and T respectively; $M_0$ gives the initial state (marking) of a system. The icons used in the model are given in FIG. 3.

To describe the hybrid properties of an oil refinery, a token in discrete place is modeled as a discrete one. However, a token in a continuous place can be treated as both a discrete one and continuous one. When it is treated as a discrete one, it indicates the fact that there is crude oil in a device; while it is treated as a continuous one, it presents the amount of oil in a device, which is called token volume. A discrete or timed transition behaves just as the one in a general PN, while a continuous transition should be fired according to a given rate. Based on this idea, we now introduce the model for the system. A refinery contains different devices that are the resources for the system. According to ROPN modeling, the key is to model the resources. For crude oil operations, the resources are tanks and pipelines. Thus, we present the PN models for them first.

Figure 3:
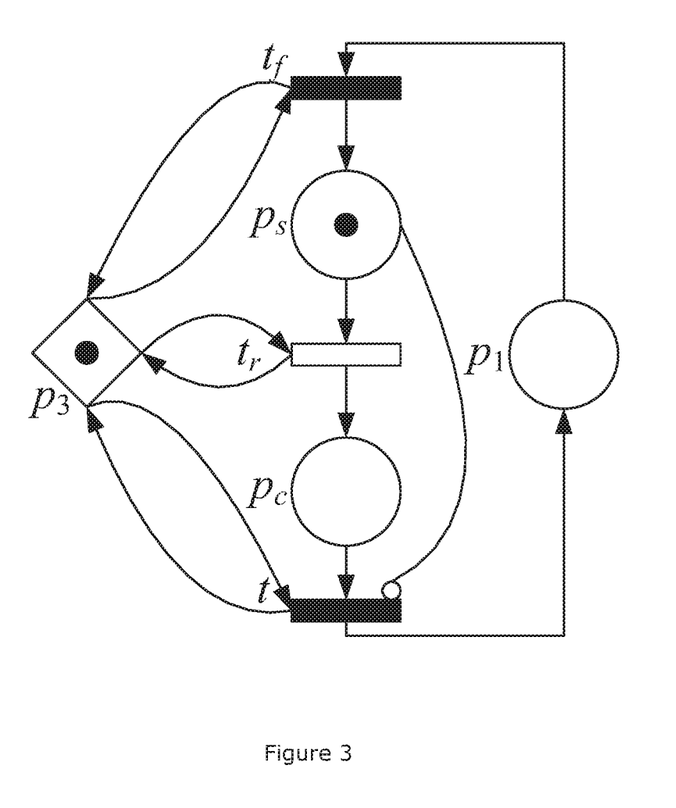
FIG. 3 is a diagram illustrating a model of a Petri net model for a tank in an oil refinery.

The PN model for a storage or charging tank is shown in FIG. 3. In the model, continuous places $p_s$ and $p_c$ are used to describe the state of a tank. When there is a token in $p_s$, or $p_c$, or both, it indicates that the tank holds some oil in it, otherwise it does not. If there is a token in $p_s$, then the oil in a tank is not ready for discharging, or continuous transition t cannot fire. Continuous place $p_1$ is used to model the capacity of a tank available at a marking, while discrete place $p_3$ is used to realize the control logic for a tank.

Continuous transitions $t_f$ and t are used to model the charging and discharging of a tank. With one token in $p_3$, only one of transitions $t_f$, $t_r$, and t can fire at a time such that a tank cannot be charged and discharged at the same time. Then, timed transition $t_r$ and inhibitor arc ($p_s$, t) together with the control logic provided by $p_3$ ensure that the oil residency time constraint cannot be violated. In this way, a tank is well modeled.

Figure 4:
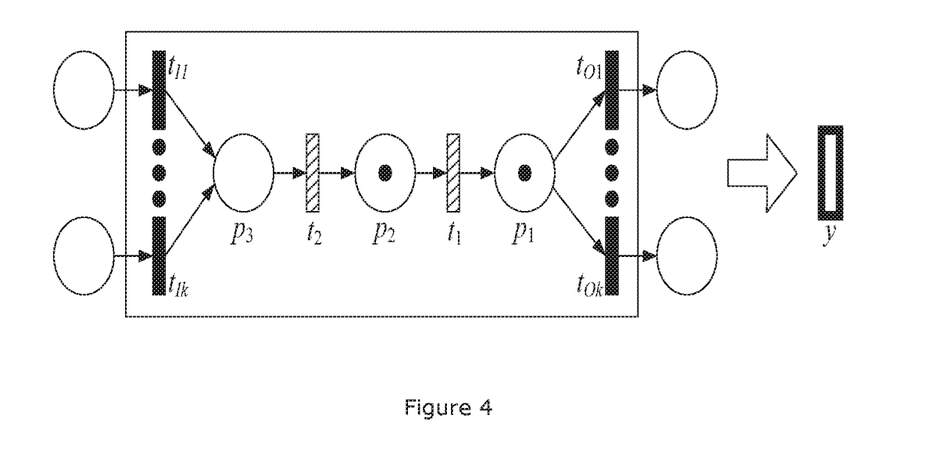
FIG. 4 is a diagram illustrating a model of a Petri net model for a pipeline in an oil refinery.

The PN model for a pipeline is shown in FIG. 4. Assume that the largest number of different oil segments in a pipeline is three. Then, continuous places $p_1$-$p_3$ are used to model these segments. With $t_1$ being a discrete transition, when the token in $p_1$ goes out, $t_1$ fires immediately such that the token in $p_2$ enters into $p_1$ and its behavior is well modeled. Transitions $t_{I1}$-$t_{Ik}$ are used to model oil charging into a pipeline from different storage tanks, while $t_{O1}$-$t_{Ok}$ are used to model oil charging into different charging tanks from the pipeline. Let $T_I=\{t_{I1}, t_{I2}, \ldots, t_{Ik}\}$ and $T_O=\{t_{O1}, t_{O2}, \ldots, t_{Ok}\}$. We pose a restriction that only one transition in $T_I$ and one in $T_O$ can fire with the same rate at a time such that a pipeline can feed one charging tank at a time and receives oil from one storage tank only. This model can be described by a reduced model as shown in the right side of FIG. 4, which is denoted by transition y.

Figure 5:
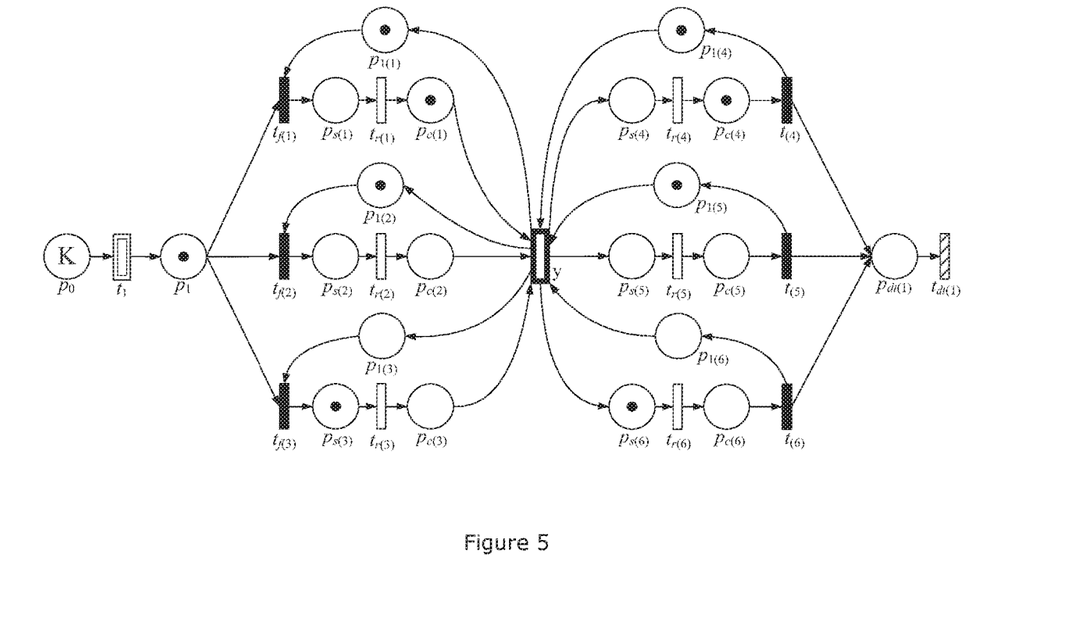
FIG. 5 is a diagram illustrating a model of a Petri net model for an oil refinery.

Based on the PN models for devices, we can present a PN model for the whole system by describing the behavior among the devices. By ignoring the discrete place and the inhibitor arc in the PN of a tank for clarity, a PN model for a system with three storage tanks, three charging tanks, and one distiller is depicted in FIG. 5. In the model, as the macro transition of a pipeline, y is the discharging transition for every storage tank and the charging transition for every charging tank.

Hence, $\{t_{f(1)}, t_{r(1)}, y, p_{s(1)}, p_{c(1)}, p_{1(1)}\}$, $\{t_{f(2)}, t_{r(2)}, y, p_{s(2)}, p_{c(2)}, p_{1(2)}\}$, and $\{t_{f(3)}, t_{r(3)}, y, p_{s(3)}, p_{c(3)}, p_{1(3)}\}$ model the three storage tanks, while $\{y, t_{r(4)}, t_{(4)}, p_{s(4)}, p_{c(4)}, p_{1(4)}\}$, $\{y, t_{r(5)}, t_{(5)}, p_{s(5)}, p_{c(5)}, p_{1(5)}\}$ and $\{y, t_{r(6)}, t_{(6)}, p_{s(6)}, p_{c(6)}, p_{1(6)}\}$ model the three charging tanks, respectively. Place $p_0$ with K tokens in it indicates that a tanker with K types of crude oil being carried is ready to be unloaded. A token in $p_1$ models the process that a type of oil is being unloaded. Thus, only $p_1$ is empty, can $t_1$ fire to move a token to $p_1$ from $p_0$, which models the process that the oil in a tanker is unloaded one type by one type. Place $p_{dt(1)}$ represents a distiller. With the input transitions of $p_{dt(1)}$ being continuous and $t_{dt(1)}$ being immediately discrete one, at any time, the amount of oil that flows into $p_{dt(1)}$ must be equal to the one that flows out it. In this way, the material flow in the system is structurally described.

It should be pointed out that only one of the output transitions of $p_1$ and one of the input transitions of $p_{dt(1)}$ can fire at a time. Also, y can serve for one storage tank and one charging tank at a time. All continuous transitions should be governed by ODs. Thus, based on the structure shown in FIG. 5, to describe the dynamic behavior of the system, we need to define the transition enabling and firing rules.

Let ˙t and ˙p denote the presets of t and p, and t˙ and p˙ the postsets of t and p, respectively. Further, let $M(p) \in \mathbb{N}=\{0, 1, 2, \ldots\}$ be the number of tokens in p at marking M, $\varphi_i$ be the color of crude oil type i and $M(p, \varphi_i)$ the number of tokens with color $\varphi_i$, $p \in P_c$, and $V(M(p)) \in \mathbb{R}^+$ and $V(M(p, \varphi_i)) \in \mathbb{R}^+$ with $\mathbb{R}^+$ being the set of non-negative real numbers, $p \in P_c$, the amount of oil in p and the amount of oil type i in p at marking M, respectively. Notice that if $M(p)=0$, then $V(M(p))=0$ must hold. Similarly, $M(p, \varphi_i)=0$ implies that $V(M(p, \varphi_i))=0$. With the above symbols, the readers can refer to [Wu et at., 2008b and 2009] for the transition enabling and firing rules for the PN model. Based on the PN model, we discuss how to schedule the crude oil operations with less charging tanks next.

If there are three charging tanks available for each distiller in an oil refinery, a feasible schedule for crude oil operations can always be found to achieve the maximal productivity. Under such a condition, the requirements on charging tank capacity and oil volume in the charging tanks at the initial state are easy to satisfy. However, as pointed out earlier, in practice, there may not be so many charging tanks due to maintenance requirement and production capacity extension. Thus, in this situation, we need to schedule a system with less than three charging tanks for a distiller for some time. The aim of this paper is to solve such a challenging problem.

In a real world scenario, many oil refineries purchases more crude oil than the amount required just for production when oil price is lower, there is sufficient oil in the storage tanks for production. Thus, to schedule crude oil operations is mainly to make decisions on ODTs and ODFs. This work is done under the assumption that there is enough crude oil in the storage tanks to be processed. Therefore, the productivity of an oil refinery is bounded by the maximal flow rate of the pipeline. With productivity being a critical objective, the scheduling problem is discussed for the achievement of maximal productivity. We develop our approach under different system configurations next.

for a system with one distiller, if there are two charging tanks, there is no feasible schedule. It is also shown that, with three charging tanks for a two-distiller system, a feasible schedule cannot be found. However, the non-existence of feasible schedule for a one-distiller system with two charging tanks does not implies that a feasible schedule cannot be found for a two-distiller system with four charging tanks.

A feasible schedule exists for such a system. Let $CK_1$-$CK_4$ denote the four charging tanks, $DT_1$ and $DT_2$ the two distillers, and $f_{dt1}$ and $f_{dt2}$ the flow rates of $DT_1$ and $DT_2$, respectively. The PN model for such a system is depicted in FIG. 5, where $\{y, t_{r(1)}, t_{(1)}, p_{s(1)}, p_{c(1)}, p_{1(1)}\}$, $\{y, t_{r(2)}, t_{(2)}, p_{s(2)}, p_{c(2)}, p_{1(2)}\}$, $\{y, t_{r(3)}, t_{(3)}, p_{s(3)}, p_{c(3)}, p_{1(3)}\}$, $\{y, t_{r(4)}, t_{(4)}, p_{s(4)}, p_{c(4)}, p_{1(4)}\}$ and $p_{dt1}$ and $p_{dt2}$ are for the four charging tanks and two distillers, respectively. Let $\Omega$ denote the oil residency time in a tank, $V(CK_i, \varphi_k)$ the volume of oil with color $\varphi_k$ in tank $CK_i$, and $V_0(CK_j, \varphi_k)$ the initial crude oil volume with color $\varphi_k$ in tank $CK_j$.

Further let $$\begin{cases} V_0(CK_1, \varphi_1) = f_{dt1} / (f_{dt1} + f_{dt2}) \times \varpi + \mu_1 \\ V_0(CK_2, \varphi_1) = 0 \\ V_0(CK_3, \varphi_2) = \mu_2 \\ V_0(CK_4, \varphi_2) = f_{dt2} / f_{dt1} \times \varpi \end{cases} \quad (1)$$

where $\overline{\omega} \in [\max\{f_{dt1}/f_{dt2}\times\mu, \mu\}, \min\{Cap_1, Cap_2, f_{dt1}/f_{dt2}\times Cap_3, f_{dt1}/f_{dt2}\times Cap_4\}]$.

Figure 6:
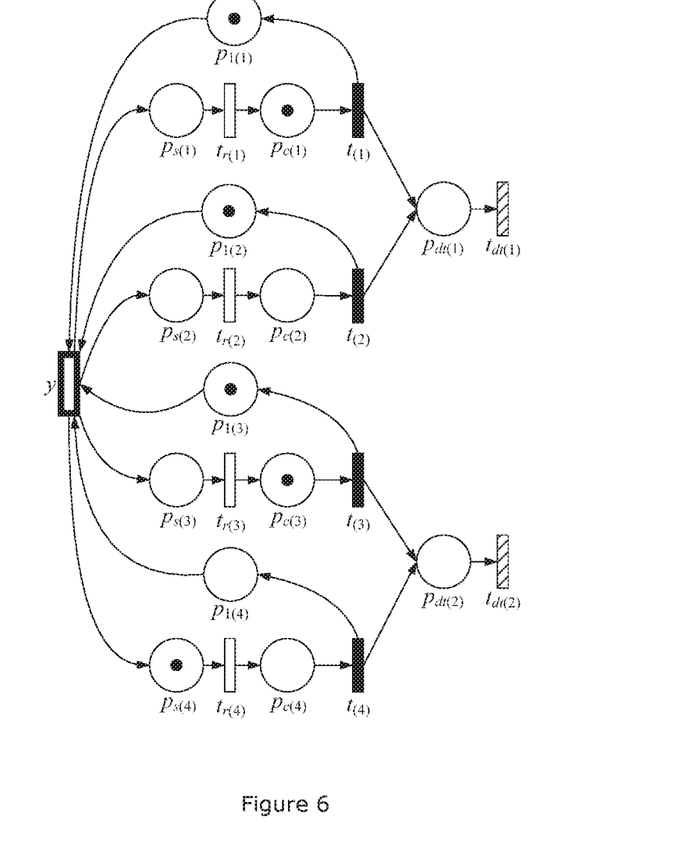
FIG. 6 is a diagram illustrating a model of a Petri net model for a tank in an oil refinery including four charging tanks and two distillers.

Then, based on the PN model shown in FIG. 6, the following scheduling algorithm can be utilized by the software.

Algorithm 1: Suppose that: 1) a refinery has two distillers $DT_1$ and $DT_2$ and their flow rates are $f_{dt1}$ and $f_{dt2}$, respectively, and $\mu=\Omega\times(f_{dt1}+f_{dt2})$, $\mu_1=\Omega\times f_{dt1}$, and $\mu_2=\Omega\times f_{dt2}$; 2) the pipeline has a maximal flow rate $f_{pm}=f_{dt1}+f_{dt2}$; 3) four charging tanks $CK_1$-$CK_4$ are available and their capacity is $Cap_1$-$Cap_4$ with $\min\{Cap_1, Cap_2, Cap_3, Cap_4\}\geq\mu$; 4) during the scheduling horizon, $DT_1$ processes oil type #1 represented by color $\varphi_1$ and $DT_2$ processes oil type #2 represented by color $\varphi_2$; 5) $CK_1$ and $CK_2$ are used for serving $DT_1$, while $CK_3$ and $CK_4$ for serving $DT_2$; 6) initially, $CK_1$ and $CK_3$ with oil volume $V_0(CK_1, \varphi_1)$ and $V_0(CK_3, \varphi_2)$ in them are feeding $DT_1$ and $DT_2$ respectively; $CK_4$ with oil volume $V_0(CK_4, \varphi_2)$ in it has just been charged; and $CK_2$ is empty and ready for charging. Then, the system can be scheduled as follows.

1. For the pipeline, during the scheduling horizon, the following operations are sequentially performed:
    1.1. The pipeline starts feeding $CK_2$ with volume $\overline{\omega}$ of oil type #1 and flow rate $f_{pm}$, and then go to Step 1.2.
    1.2. The pipeline starts feeding $CK_3$ with volume $f_{dt2}/f_{dt1}\times\overline{\omega}$ of oil type #2 and flow rate $f_{pm}$, and then go to Step 1.3.
    1.3. The pipeline starts feeding $CK_1$ with volume $\overline{\omega}$ of oil type #1 and flow rate $f_{pm}$, and then go to Step 1.4.
    1.4. The pipeline starts feeding $CK_4$ with volume $f_{dt2}/f_{dt1}\times\overline{\omega}$ of oil type #2 and flow rate $f_{pm}$, and go to Step 1.1.

2. For $DT_1$, during the scheduling horizon, the following operations are sequentially performed:
    2.1. $CK_1$ is used to feed $DT_1$ until it is empty, and then go to Step 2.2.
    2.2. $CK_2$ is used to feed $DT_1$ until it is empty, and then go to Step 2.1.

3. For $DT_2$, during the scheduling horizon, the following operations are sequentially performed:
    3.1. $CK_3$ is used to feed $DT_2$ until it is empty, and go to Step 3.2.
    3.2. $CK_4$ is used to feed $DT_2$ until it is empty, and go to Step 3.1.

The feasibility of the schedule obtained by Algorithm 1 is shown by reference to the proof below.

With the PN model shown in FIG. 6, the system can be scheduled as follows.

1. Assume that the initial time is $\tau_0$ with initial marking $M_0$ for the PN model. Then, at $M_0$, we have $M_0(p_{c(1)})=M_0(p_{c(3)})=M_0(p_{s(4)})=1$. From (1), $\overline{\omega}-V_0(CK_1, \varphi_1)=f_{dt2}/(f_{dt1}+f_{dt2})\times\overline{\omega}-\mu_1\geq0$ holds, i.e., the initial crude oil volume in $CK_1$ is less than $\overline{\omega}$: Hence, $V(M_0(p_{c(1)}), \varphi_1)=V_0(CK_1, \varphi_1)=f_{dt1}/(f_{dt1}+f_{dt2})\times\overline{\omega}+\mu_1\leq\overline{\omega}_1$, $V(M_0(p_{c(3)}), \varphi_2)=V_0(CK_3,\varphi_2)=\mu_2$, $V(M_0(p_{s(4)}), \varphi_2)=V_0(CK_4, \varphi_2)=f_{dt2}/f_{dt1}\times\overline{\omega}$. At this marking, transition y starts its firing for feeding $CK_2$ with volume $\overline{\omega}$ of oil type #1 and flow rate $f_{pm}$; and $CK_1$ and $CK_3$ are feeding $DT_1$ and $DT_2$ by the firing of $t_{(1)}$ and $t_{(3)}$, respectively.

2. At time $\tau_1=\tau_0+\Omega$, the oil in $CK_3$ is used up and the PN is transferred to $M_1$. At this marking, we have $M_1(p_{c(3)})=0$, or $V(M_1(p_{c(3)}), \varphi_2)=0$; $M_1(p_{c(4)})=1$ and $V(M_1(p_{c(4)}), \varphi_2)=V_0(CK_4, \varphi_2)=f_{dt2}/f_{dt1}\times\overline{\omega}$, implying that the oil in $CK_4$ is ready for feeding; $CK_1$ is feeding $DT_1$ with $V(M_1(p_{c(1)}), \varphi_1)=f_{dt1}/f_{dt1}+f_{dt2})\times\overline{\omega}$ of oil being remained and $CK_4$ starts to feed $DT_2$ by firing $t_{(4)}$; and $CK_2$ is being fed by the firing of y with volume $V(M_1(p_{s(2)}), \varphi_1)=\mu$ of oil being charged into it.

3. At time $\tau_2=\tau_0+\overline{\omega}/f_{pm}$, the charging process of $CK_2$ has just been completed and the PN is transferred to $M_2$. At this marking, we have $V(M_2(p_{s(2)}), \varphi_1)=\overline{\omega}$; $CK_1$ is feeding $DT_1$ with $V(M_2(p_{c(1)}), \varphi_1)=\mu_1$ of oil left; $CK_3$ is empty and starts to be fed by firing y with volume $f_{dt2}/f_{dt1}\times\overline{\omega}$ of oil; and $CK_4$ is feeding $DT_2$ with $V(M_2(p_{c(4)}), \varphi_2)=f_{dt2}\times f_{dt2}\times\overline{\omega}/f_{dt1}/f_{pm}+\Omega\times f_{dt2}$ of oil being left.

4. At time $\tau_3=\tau_2+\Omega$, $CK_1$ is emptied and the PN is transferred into $M_3$. At this marking, we have $M_3(p_{s(1)})=M_3(p_{c(1)})=0$; the oil in $CK_2$ is ready for feeding and starts to feed $DT_1$ with volume $\overline{\omega}$ of oil in it; $CK_3$ is still being charged by the firing of y; and $CK_4$ is feeding $DT_2$ with volume $V(M_3(p_{c(4)}), \varphi_2)=f_{dt2}/f_{dt1}\times\overline{\omega}-\overline{\omega}/(f_{dt1}+f_{dt2})\times f_{dt2}$ of oil left.

5. At time $\tau_4=\tau^2+f_{dt2}\times\overline{\omega}/f_{dt1}/(f_{dt1}+f_{dt2})$, the charging of $CK_3$ is completed and $CK_1$ starts to be charged by firing y with volume $\overline{\omega}$ and flow rate $f_{pm}$. At this marking, $CK_2$ is feeding $DT_1$ with $V(M_4(p_{c(2)}), \varphi_1)=f_{dt1}\times\overline{\omega}/f_{pm}+\Omega\times f_{dt1}$ of oil left; $V(M_4(p_{s(3)}), \varphi_2)=f_{dt2}/f_{dt1}\times\overline{\omega}$; and $CK_4$ is feeding $DT_2$ with $V(M_4(p_{c(4)}), \varphi_2)=\Omega\times f_{dt2}$ of oil left.

As $M_4$ and $M_0$ are equivalent, this process can continue such that the system can operate uninterruptedly, i.e., a feasible schedule is found to realize the required refining process.

By Algorithm 1, with two charging tanks for a distiller, a feasible schedule can be found. In scheduling a refinery, it is desired that the number of charging tank switches in distiller feeding is as small as possible, which requires that a charging tank be charged with much oil as possible. In practice, the capacity of a charging tank is much greater than $\mu$. Also, with $\overline{\omega}$ being given above, the tank can be charged to capacity. Thus, the obtained schedule is practically applicable. Let $$\begin{cases} V_0(CK_1, \varphi_1) = \varpi \\ V_0(CK_2, \varphi_1) = 0 \\ V_0(CK_3, \varphi_2) = f_{dt2}/(f_{dt1}+f_{dt2})\times\varpi \\ V_0(CK_4, \varphi_2) = f_{dt2}/f_{dt1}\times\varpi \end{cases} \quad (2)$$

where $\overline{\omega} \in [\max\{f_{dt1}/f_{dt2}\times\mu, \mu\}, \min\{Cap_1, Cap_2, f_{dt1}/f_{dt2}\times Cap_3, f_{dt1}/f_{dt2}\times Cap_4\}]$. Then, based on the PN model shown in FIG. 6, the following scheduling algorithm (2) is utilised.

Algorithm 2: Suppose that: 1) a refinery has two distillers $DT_1$ and $DT_2$ with flow rates $f_{dt1}$, and $f_{dt2}$, and $\mu=\Omega\times(f_{dt1}+f_{dt2})$, $\mu_1=\Omega\times f_{dt1}$, and $\mu_2=\Omega\times f_{dt2}$; 2) the pipeline has a maximal flow rate $f_{pm}=f_{dt1}+f_{dt2}$; 3) four charging tanks $CK_1$-$CK_4$ are available and their capacity is $Cap_1$-$Cap_4$ with $\min\{Cap_1, Cap_2, Cap_3, Cap_4\}\geq\mu$; 4) during the scheduling horizon, $DT_1$ processes oil type #1 represented by color $\varphi_1$ and $DT_2$ processes oil type #2 represented by color $\varphi_2$; 5) $CK_1$ and $CK_2$ are used for serving $DT_1$, while $CK_3$ and $CK_4$ for $DT_2$; 6) initially, $CK_1$ and $CK_3$ with volume $V_0(CK_1, \varphi_1)$ and $V_0(CK_3, \varphi_2)$ of oil in them are feeding $DT_1$ and $DT_2$ respectively; $CK_4$ with volume $V_0(CK_4, \varphi_2)$ of oil in it has just been charged; and $CK_2$ is empty and ready for charging. Then, the system can be scheduled as follows.

1. For the pipeline, during the scheduling horizon, the following operations are sequentially performed:
    1.1. The pipeline starts feeding $CK_2$ with volume $\overline{\omega}$ of oil type #1 and flow rate $f_{pm}$, and go to Step 1.2.
    1.2. The pipeline starts feeding $CK_3$ with volume $f_{dt2}/f_{dt1}\times\overline{\omega}$ of oil type #2 and flow rate $f_{pm}$, and go to Step 1.3.
    1.3. The pipeline starts feeding $CK_1$ with volume $\overline{\omega}$ of oil type #1 and flow rate $f_{pm}$, and go to Step 1.4.

1.4. The pipeline starts feeding $CK_4$ with volume $f_{dt2}/f_{dt1} \times \overline{\omega}$ of oil type #2 and flow rate $f_{pm}$, and go to Step 1.1.

2. For $DT_1$, during the scheduling horizon, the following operations are sequentially performed:
   2.1. At the beginning, $CK_1$ is used to feed $DT_1$ until it is empty, and go to Step 2.2.
   2.2. $CK_2$ is used to feed $DT_1$ until it is empty, and go to Step 2.1.

3. For $DT_2$, during the scheduling horizon, the following operations are sequentially performed:
   3.1. At the beginning, $CK_3$ is used to feed $DT_2$ until it is empty, and go to Step 3.2.
   3.2. $CK_4$ is used to feed $DT_2$ until it is empty, and go to Step 3.1.

The feasibility of the schedule obtained by Algorithm 2 is ensured by the following proof below.

With the PN model shown in FIG. 6, the system can be scheduled as follows.

1. Assume that the initial time is $\tau_0$ with $M_0$ being the initial marking for the PN. Then, at $M_0$, we have $M_0(p_{c(1)})=M_0(p_{c(3)})=M_0(p_{s(4)})=1$, $M_0(p_{s(2)})=M_0(p_{c(2)})=0$, $V(M_0(p_{c(1)}), \varphi_1)=V_0(CK_1, \varphi_1)=\overline{\omega}$, $V(M_0(p_{c(3)}), \varphi_2)=V_0(CK_3, \varphi_2)=f_{dt2}/(f_{dt1}+f_{dt2})\times\overline{\omega}$, and $V(M_0(p_{s(4)}), \varphi_2)=V_0(CK_4, \varphi_2)=f_{dt2}/f_{dt1}\times\overline{\omega}$. At this marking, transition y starts its firing for charging $CK_2$ with volume $\overline{\omega}$ of oil type #1 and flow rate $f_{pm}$; and $CK_1$ and $CK_3$ are feeding $DT_1$ and $DT_2$ by the firing of $t_{(1)}$ and $t_{(3)}$, respectively.

2. At time $\tau_1=\tau_0+\Omega$, the oil in $CK_4$ is ready for feeding and the PN is transferred to $M_1$. At this marking, we have $V(M_1(p_{c(4)}), \varphi_2)=V_0(CK_4, \varphi_2)=f_{dt2}/f_{dt1}\times\overline{\omega}$; $CK_1$ is feeding $DT_1$ with volume $V(M_1(p_{c(1)}), \varphi_1)=\overline{\omega}-\mu_1$ of oil being remained, while $CK_3$ is feeding $DT_2$ with $V(M_2(p_{c(3)}), \varphi_2)=f_{dt2}/f_{pm}\times\overline{\omega}-\mu_2$ of oil being remained, and $CK_2$ is being charged by the firing of y with volume $V(M_1(p_{s(2)}), \varphi_1)=\mu$ of oil being charged into it.

3. At time $\tau_2=\tau_0+\overline{\omega}/f_{pm}$, the charging process of $CK_2$ has just been completed and the PN is transferred to $M_2$. At this marking, we have $V(M_2(p_{s(2)}), \varphi_1)=\overline{\omega}$; $CK_1$ is feeding $DT_1$ with $(V(M_2(p_{c(1)}), \varphi_1)=\overline{\omega}-\overline{\omega}/(f_{dt1}+f_{dt2})\times f_{dt1}=\overline{\omega}\times f_{dt2}/f_{pm}$ of oil left; $CK_3$ is emptied and starts to be charged by firing y with volume $f_{dt2}/f_{dt1}\times\overline{\omega}$ of oil; and $CK_4$ starts to feed $DT_2$ with $V(M_2(p_{c(4)}), \varphi_2)=f_{dt2}/f_{dt1}\times\overline{\omega}$ in it.

4. At time $\tau_3=\tau_2+\Omega$, the oil in $CK_2$ is ready for feeding with volume $\overline{\omega}$ of oil in it and the PN is transferred into $M_3$. At this marking, we have $V(M_3(p_{c(2)}), \varphi_1)=\overline{\omega}$; $CK_1$ is feeding $DT_1$ with volume $V(M_3(p_{c(1)}), \varphi_1)=f_{dt2}/f_{pm}\times\overline{\omega}-\mu_1$ of oil being remained; $CK_3$ is still being charged by the firing of y; $CK_4$ is feeding $DT_2$ with volume $V(M_3(p_{c(4)}), \varphi_2)=f_{dt2}/f_{dt1}\times\overline{\omega}-\mu_2$ of oil left.

5. At time $\tau_4=\tau_2 f_{dt2}\times\overline{\omega}/f_{dt1}/f_{pm}$, $CK_1$ is emptied and starts to be charged by firing y with volume $\overline{\omega}$ and flow rate $f_{pm}$. The PN is transferred into $M_4$. At this marking, we have $V(M_4(p_{c(1)}), \varphi_1)=0$; $CK_2$ starts to feed $DT_1$ with $V(M_4(p_{c(2)}), \varphi_1)=\overline{\omega}$; the charging of $CK_3$ is completed; and $CK_4$ is feeding $DT_2$ with $V(M_4(p_{c(4)}), \varphi_2)=f_{dt2}/f_{pm}\times\overline{\omega}$ of oil left.

As $M_4$ and $M_0$ are equivalent, this process can continue such that the system can operate uninterruptedly, i.e., a feasible schedule is found to realize the required refining process.

As shown with reference to Algorithm 2, the obtained schedule based on Algorithm 2 is the same as the schedule obtained by Algorithm 1. The only difference is that each algorithm begins from a different set of initial states.

Note that the initial states in Algorithms 1 and 2 are given as conditions. Thus, the two algorithms allow for the creation of feasible schedules despite starting from different initial states. This property eases the finding of a feasible schedule. The following algorithm further relaxes the required initial conditions. Let $$\begin{cases} f_{dt1}/(f_{dt1}+f_{dt2})\times\varpi+\mu_1 \leq V_0(CK_1, \varphi_1) \leq \varpi \\ V_0(CK_2, \varphi_1) = 0 \\ \mu_2 \leq V_0(CK_3, \varphi_2) \leq f_{dt2}/(f_{dt1}+f_{dt2})\times\varpi \\ V_0(CK_4, \varphi_2) = f_{dt2}/f_{dt1}\times\varpi \end{cases}$$

where $\overline{\omega} \in [\max\{f_{dt1}/f_{dt2}\times\mu,\mu\}, \min\{Cap_1, Cap_2, f_{dt1}/f_{dt2}\times Cap_3, f_{dt1}/f_{dt2}\times Cap_4\}]$. Then, based on the PN model shown in FIG. 6, another scheduling algorithm is provided.

Algorithm 3: Suppose that: 1) a refinery has two distillers $DT_1$ and $DT_2$ with flow rates $f_{dt1}$ and $f_{dt2}$, respectively, and $\mu=\Omega\times(f_{dt1}+f_{dt2})$, $\mu_1=\Omega\times f_{dt1}$, and $\mu_2=\Omega\times f_{dt2}$; 2) the pipeline has a maximal flow rate $f_{pm}=f_{dt1}+f_{dt2}$; 3) four charging tanks $CK_1$-$CK_4$ are available and their capacity is $Cap_1$-$Cap_4$ with $\min\{Cap_1, Cap_2, Cap_3, Cap_4\}\geq\mu$; 4) during the scheduling horizon, $DT_1$ processes oil type #1 represented by color $\varphi_1$ and $DT_2$ processes oil type #2 represented by color $\varphi_2$; 5) $CK_1$ and $CK_2$ are used for serving $DT_1$, while $CK_3$ and $CK_4$ for serving $DT_2$; 6) initially, $CK_1$ and $CK_3$ with volume $V_0(CK_1, \varphi_1)$ and $V_0(CK_3, \varphi_2)$ of oil in them are feeding $DT_1$ and $DT_2$ respectively; $CK_4$ with volume $V_0(CK_4, \varphi_1)$ of oil in it has just been charged; and $CK_2$ is empty and ready for charging. Then, the system can be scheduled as follows.

1. For the pipeline, during the scheduling horizon, the following operations are sequentially performed:
   1.1. The pipeline starts feeding $CK_2$ with volume $\overline{\omega}$ of oil type #1 and flow rate $f_{pm}$, and go to Step 1.2.
   1.2. The pipeline starts feeding $CK_3$ with volume $f_{dt2}/f_{dt1}\times\overline{\omega}$ of oil type #2 and flow rate $f_{pm}$, and go to Step 1.3.
   1.3. The pipeline starts feeding $CK_1$ with volume $\overline{\omega}$ of oil type #1 and flow rate $f_{pm}$, and go to Step 1.4.
   1.4. The pipeline starts feeding $CK_4$ with volume $f_{dt2}/f_{dt1}\times\overline{\omega}$ of oil type #2 and flow rate $f_{pm}$, and go to Step 1.1.

2. For $DT_1$, during the scheduling horizon, the following operations are sequentially performed:
   2.1. $CK_1$ is used to feed $DT_1$ until it is empty, and go to Step 2.2.
   2.2. $CK_2$ is used to feed $DT_1$ until it is empty, and go to Step 2.1.

3. For $DT_2$, during the scheduling horizon, the following operations are sequentially performed:
   3.1. At the beginning, $CK_3$ is used to feed $DT_2$ until it is empty, and go to Step 3.2.
   3.2. $CK_4$ is used to feed $DT_2$ until it is empty, and go to Step 3.1.

The feasibility of the schedule obtained by Algorithm 3 is ensured by the feasibility of schedules obtained by Algorithms 1 and 2. Therefore, the schedule obtained by Algorithm 3 is feasible.

Note that, for the initial states in Algorithms 1-3, $V_0(CK_1, \varphi_1)+V_0(CK_2, \varphi_1)=f_{dt1}/(f_{dt1}+f_{dt2})\times\overline{\omega}+\mu_1$ and $V_0(CK_3, \varphi_2)+V_0(CK_4, \varphi_2)=\mu_2+f_{dt2}/f_{dt1}\times\overline{\omega}$ in Algorithm 1 are the lower bound of $V_0(CK_1, \varphi_1)+V_0(CK_2, \varphi_1)$ and $V_0(CK_3, \varphi_2)+V_0(CK_4, \varphi_2)$ in Algorithm 3, respectively, while $V_0(CK_1, \varphi_1)+V_0(CK_2, \varphi_1)=\overline{\omega}$ and $V_0(CK_3, \varphi_2)+V_0(CK_4, \varphi_2)=f_{dt2}/(f_{dt1}-f_{dt2})\times\overline{\omega}+f_{dt2}/(f_{dt1}\times\overline{\omega})$ in Algorithm 2 are the upper bound of $V_0(CK_1, \varphi_1)+V_0(CK_2, \varphi_1)$ and $V_0(CK_3, \varphi_2)+V_0(CK_4, \varphi_2)$ in Algorithm 3, respectively.

Hence, according to Algorithm 3, for any initial state between the ones given in Theorems 1 and 2, a feasible schedule exists and can be found. In other words, Algorithm 3 states that, to find a feasible schedule with two charging tanks per distiller, the amount of oil initially in the charging tanks can be a range, not just a point as given in Algorithms 1 and 2. This implies that the initial conditions do not impose a strict restriction in scheduling a system.

Furthermore, it follows from the schedule given in Algorithm 3 that the scheduling method is same as that in Algorithms 1 and 2. Thus, for any acceptable initial state, a feasible schedule can be found.

Figure 7:
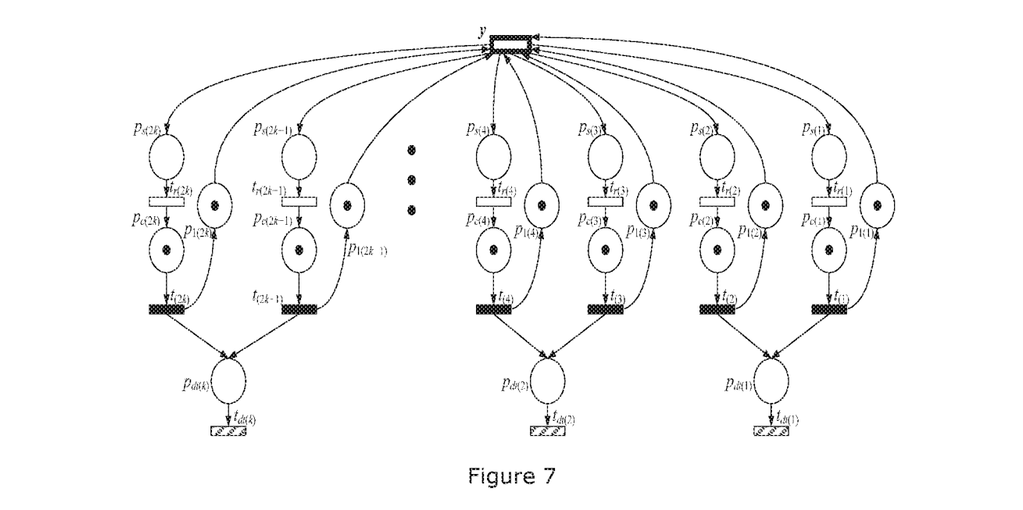
FIG. 7 is a diagram illustrating a model of a Petri net model for a tank in an oil refinery with more than two distillers.

Based on the results for the two-distiller case, a more general case with more than two distillers may be derived. That is, a general case with k>2 distillers. Using similar nomenclature to the previous algorithms, $p_{dt\delta}$, $\{y, t_{r(2\delta-1)}, t_{(2\delta-1)}, p_{s(2\delta-1)}, p_{c(2\delta-1)}, p_{1(2\delta-1)}\}$ and $\{y, t_{r(2\delta)}, t_{(2\delta)}, p_{s(2\delta)}, p_{c(2\delta)}, p_{1(2\delta)}\}$ represent distiller $DT_\delta$, charging tanks $CK_{2\delta-1}$, and $CK_{2\delta}$ for feeding $DT_\delta$, respectively, to form a PN model for such a system as shown in FIG. 7.

Let $A=\max\{f_{dt1}/f_{dt\delta}\times\mu|\delta\in\mathbb{N}_k=\{1, 2, \ldots, k\}\}$ and $B=\min\{Cap_1, Cap_2, f_{dt1}/f_{dt2}\times Cap_3, f_{dt1}/f_{dt2}\times Cap_4, \ldots, f_{dt1}/f_{dtk}\times Cap_{2k-1}, f_{dt1}/f_{dtk}\times Cap_{2k}\}$. Further let $$\begin{cases} V_0(CK_1, \varphi_1) = 0, V_0(CK_2, \varphi_1) = \mu_1 + \varpi \times f_{dt1}/f_{pm} \\ V_0(CK_3, \varphi_2) = 0, V_0(CK_4, \varphi_2) = \mu_2 + \frac{(\varpi \times f_{dt2})}{(f_{pm} \times f_{dt1})} \times (f_{dt1} + f_{dt2}) \\ \ldots \\ V_0(CK_{2\delta-1}, \varphi_\delta) = 0, V_0(CK_{2\delta}, \varphi_\delta) = \mu_\delta + \frac{(\varpi \times f_{dt\delta})}{(f_{pm} \times f_{dt1})} \times \sum_{i=1}^{\delta} f_{dti} \\ \ldots \\ V_0\begin{pmatrix} CK_{2(k-1)-1}, \\ \varphi_{k-1} \end{pmatrix} = 0, V_0\begin{pmatrix} CK_{2(k-1)}, \\ \varphi_{k-1} \end{pmatrix} = \mu_{k-1} + \frac{(\varpi \times f_{dt(k-1)})}{(f_{pm} \times f_{dt1})} \times \sum_{i=1}^{k-1} f_{dti} \\ V_0(CK_{2k-1}, \varphi_k) = \varpi \times f_{dtk}/f_{dt1}, V_0(CK_{2k}, \varphi_k) = \mu_k \end{cases}$$ (4)

where $\overline{\varpi} \in [A, B]$. Then, based on the PN model shown in FIG. 7, the following scheduling algorithm is derived.

Algorithm 4: Suppose that: 1) a refinery has k (>2) distillers $DT_1$-$DT_k$ with flow rates $f_{dt1}$-$f_{dtk}$, and $\mu=\Omega\times(f_{dt1}+f_{dt2}+f_{dtk})$, $\mu_1=\Omega\times f_{dt1}$, $\mu_2=\Omega\times f_{dt2}$, ..., $\mu_k=\Omega\times f_{dtk}$, and $f_{dtmin}=\min\{f_{dt\delta}\mu\delta \in \mathbb{N}_k\}$; 2) the pipeline has a maximal flow rate $f_{pm}=f_{dt1}+f_{dt2}+\ldots+f_{dtk}$; 3) 2k charging tanks $CK_1$-$CK_{2k}$ are available and their capacity is $Cap_1$-$Cap_{2k}$; 4) $CK_{2\delta-1}$ and $CK_{2\delta}$ are used for feeding $DT_\delta$ with $Cap_{2\delta-1}\geq f_{dt\delta}/f_{dtmin}\times\mu$ and $Cap_{2\delta}\geq f_{dt\delta}/f_{dtmin}\times\mu$, $\delta \in \mathbb{N}_k$; 5) in the scheduling horizon, k types of crude oil with colors $\varphi_1$-$\varphi_k$ are processed by $DT_1$-$DT_k$, respectively; 6) initially, $CK_1$ is empty and starts to be charged by the pipeline and $CK_2$ with $V_0(CK_2, \varphi_1)$ of oil in it is feeding $DT_1$; $CK_{2\delta-1}$ is empty or $V_0(CK_{2\delta-1}, \varphi_\delta)=0$ and $CK_{2\delta}$ with $V_0(CK_{2\delta}, \varphi_\delta)$ of oil in it is feeding $DT_\delta$, $\delta\in\mathbb{N}_{k-1}\backslash\{1\}$; $CK_{2k-1}$ has just finished its charging process with $V_0(CK_{2k-1}, \varphi_k)$ of oil in it and $CK_{2k}$ with $V_0(CK_{2k}, \varphi_k)$ of oil in it is feeding $DT_k$. Then, the system can be scheduled as follows.

1. For the pipeline, during the scheduling horizon, the following operations are sequentially performed:

1.1. The pipeline starts feeding $CK_1$ with volume $\overline{\varpi}$ of oil type #1 and flow rate $f_{pm}$, and go to the next step.

1.2. The pipeline starts feeding $CK_3$ with volume $f_{dt2}/f_{dt1}\times\overline{\varpi}$ of oil type #2 and flow rate $f_{pm}$, and go to the next step.

1.(k-1). The pipeline starts feeding $CK_{2(k-1)-1}$ with volume $f_{dt(k-1)}/f_{dt1}\times\overline{\varpi}$ of oil type #(k-1) and flow rate $f_{pm}$, and go to the next step.

1.k. The pipeline starts feeding $CK_{2k}$ with volume $f_{dtk}/f_{dt1}\times\overline{\varpi}$ oil type #k and flow 1.(k+1). The pipeline starts feeding $CK_2$ with volume $\overline{\varpi}$ of oil type #1 and flow rate $f_{pm}$, and go to the next step.

1.(k+2). The pipeline starts feeding $CK_4$ with volume $f_{dt2}/f_{dt1}\times\overline{\varpi}$ of oil type #2 and flow rate $f_{pm}$, and go to the next step.

1.(2k-1). The pipeline starts feeding $CK_{2(k-1)}$ with volume $f_{dt(k-1)}/f_{dt1}\times\overline{\varpi}$ of oil type #(k-1) and flow rate $f_{pm}$, and go to the next step.

1.2k. The pipeline starts feeding $CK_{2k-1}$ with volume $f_{dtk}/f_{dt1}\times\overline{\varpi}$ of oil type #k and flow rate $f_{pm}$, and go to Step 1.1.

2. For $DT_\delta$, $\delta \in \mathbb{N}_k$, during the scheduling horizon, the following operations are sequentially performed:

2.1. At the beginning, $CK_{2\delta}$ is used to feed $DT_\delta$ until it is empty, and go to Step 2.2.

2.2. $CK_{2\delta-1}$ is used to feed $DT_\delta$ until it is empty, and go to Step 2.1.

Therefore, the schedule obtained by Algorithm 4 is feasible.

Algorithm 4 is the extension of Algorithm 1 and demonstrates that a feasible schedule can be found for crude oil operations for a system with more than two distillers and two charging tanks per distiller if the volume of oil in the charging tanks at the initial state is given by equation (4).

The following algorithm shows that a feasible schedule can be also found for different initial states. Let $$\begin{cases} V_0(CK_1, \varphi_1) = 0, V_0(CK_2, \varphi_1) = \varpi \\ V_0(CK_3, \varphi_2) = \varpi \times f_{dt2}/f_{dt1}, V_0(CK_4, \varphi_2) = (\varpi \times f_{dt2})/f_{pm} \\ \ldots \\ V_0(CK_{2\delta-1}, \varphi_\delta) = \varpi \times f_{dt\delta}/f_{dt1}, V_0(CK_{2\delta}, \varphi_\delta) = \frac{(\varpi \times f_{dt\delta})}{(f_{pm} \times f_{dt1})} \times \sum_{i=1}^{\delta-1} f_{dti} \\ \ldots \\ V_0\begin{pmatrix} CK_{2(k-1)-1}, \\ \varphi_{k-1} \end{pmatrix} = \frac{\varpi \times f_{dt(k-1)}}{f_{dt1}}, V_0\begin{pmatrix} CK_{2(k-1)}, \\ \varphi_{k-1} \end{pmatrix} = \frac{(\varpi \times f_{dt(k-1)})}{(f_{pm} \times f_{dt1})} \times \sum_{i=1}^{k-2} f_{dti} \\ V_0(CK_{2k-1}, \varphi_k) = \varpi \times f_{dtk}/f_{dt1}, V_0(CK_{2k}, \varphi_k) = \frac{(\varpi \times f_{dtk})}{(f_{pm} \times f_{dt1})} \times \sum_{i=1}^{k-1} f_{dti} \end{cases}$$ (5)

where $\overline{\varpi} \in [A, B]$. Then, based on the PN model shown in FIG. 7, the following scheduling algorithm is derived.

Algorithm 5: Suppose that: 1) a refinery has k (>2) distillers $DT_1$-$DT_k$ with flow rates $f_{dt1}$-$f_{dtk}$, and $\mu=\Omega\times(f_{dt1}+f_{dt2}+\ldots+f_{dtk})$, $\mu_1=\Omega\times f_{dt1}$, $\Omega\times f_{dt2}$, ..., $\mu_k=\Omega\times f_{dtk}$, and $f_{dtmin}=\min\{f_{dt\delta}\}$, $\delta \in \mathbb{N}_k$; 2) the pipeline has a maximal flow rate $f_{pm}=f_{dt1}+f_{dt2}+\ldots+f_{dtk}$; 3) 2k charging tanks $CK_1$-$CK_{2k}$ are available and their capacity is $Cap_1$-$Cap_{2k}$; 4) $CK_{2\delta-1}$ and $CK_{2\delta}$ are used for feeding $DT_\delta$ with $Cap_{2\delta-1}\geq f_{dt\delta}/f_{dtmin}\times\mu$ and $Cap_{2\delta}\geq f_{dt\delta}/f_{dtmin}\times\mu$, $\delta \in \mathbb{N}_k$; 5) in the scheduling horizon, k types of crude oil with colors $\varphi_1$-$\varphi_k$ are processed by $DT_1$-$DT_k$, respectively; 6) initially, $CK_1$ is empty and starts to be charged by the pipeline and $CK_2$ with $V_0(CK_2, \varphi_1)$ of oil in it is feeding $DT_1$; $CK_{2\delta}$ with $V_0(CK_{2\delta}, \varphi_\delta)$ of oil in it is feeding $DT_\delta$, $\delta\in\mathbb{N}_{k-1}\backslash\{1\}$, and $CK_{2\delta-1}$ with $V_0(CK_{2\delta-1}, \varphi_\delta)$ of oil in it is ready for feeding; $CK_{2k-1}$ has just finished its charging process with $V_0(CK_{2k-1}, \varphi_k)$ of oil in it and $CK_{2k}$ with $V_0(CK_{2k}, \varphi_k)$ of oil in it is feeding $DT_k$. Then, the system can be scheduled as follows.

1. For the pipeline, during the scheduling horizon, the following operations are sequentially performed:
   1.1. The pipeline starts feeding $CK_1$ with volume $\overline{\omega}$ of oil type #1 and flow rate $f_{pm}$, and go to the next step.
   1.2. The pipeline starts feeding $CK_4$ with volume $f_{dt2}/f_{dt1} \times \overline{\omega}$ of oil type #2 and flow rate $f_{pm}$, and go to the next step.
   1.3. The pipeline starts feeding $CK_6$ with volume $f_{dt3}/f_{dt1} \times \overline{\omega}$ of oil type #3 and flow rate $f_{pm}$, and go to the next step.
   1.k. The pipeline starts feeding $CK_{2k}$ with volume $f_{dtk}/f_{dt1} \times \overline{\omega}$ of oil type #k and flow rate $f_{pm}$, and go to the next step.
   1.(k+1). The pipeline starts feeding $CK_2$ with volume $\overline{\omega}$ of oil type #1 and flow rate $f_{pm}$, and go to the next step.
   1.(k+2). The pipeline starts feeding $CK_3$ with volume $f_{dt2}/f_{dt1} \times \overline{\omega}$ of oil type #2 and flow rate $f_{pm}$, and go to the next step.
   1.(k+3). The pipeline starts feeding $CK_5$ with volume $f_{dt3}/f_{dt1} \times \overline{\omega}$ of oil type #3 and flow rate $f_{pm}$, and go to the next step.
   1.(2k−1). The pipeline starts feeding $CK_{2(k-1)-1}$ with volume $f_{dt(k-1)}/f_{dt1} \times \overline{\omega}$ of oil type #(k−1) and flow rate $f_{pm}$, and go to the next step.
   1.2k. The pipeline starts feeding $CK_{2k-1}$ with volume $f_{dtk}/f_{dt1} \times \overline{\omega}$ of oil type #k and flow rate $f_{pm}$, and go to Step 1.1.

2. For $DT_\delta$, $\delta \in \mathbb{N}_k$, during the scheduling horizon, the following operations are sequentially performed:
   2.1. At the beginning, $CK_{2\delta}$ is used to feed $DT_\delta$ until it is empty, and go to Step 2.2.
   2.2. $CK_{2\delta-1}$ is used to feed $DT_\delta$ until it is empty, and go to Step 2.1.

The schedule obtained by Algorithm 5 is feasible.

Based on Algorithm 5, the obtained schedule is similar to that based on Algorithm 4 except that they start from different initial states. Algorithm 5 is the extension of Algorithm 2. Let $L_\delta = \mu_\delta + (\overline{\omega} \times f_{dt\delta})/(f_{pm} \times f_{dt1}) \times \Sigma_{i=1}^\delta f_{dt1}$, $H_\delta = (\overline{\omega} \times f_{dt\delta})/f_{dt1} + (\overline{\omega} \times f_{dt\delta})/(f_{pm} \times f_{dt1}) \times \Sigma_{i=1}^{\delta-1} f_{dt1}$, and $G_\delta = (\overline{\omega} \times f_{dt\delta}/(f_{pm} \times f_{dt1}) \times \Sigma_{i=1}^{\delta-1} f_{dt1}$, respectively. Then, based on Algorithms 4 and 5, just like Algorithm 3, the following algorithm further relaxes the required initial conditions. Let $$\begin{cases} V_0(CK_1, \varphi_1) = 0, \mu_1 + \varpi \times d_{dt1}/f_{pm} \leq V_0(CK_2, \varphi_1) \leq \varpi \\ \delta \in N_{k-1} \setminus \{1\}, \\ \begin{pmatrix} L_\delta \leq V_0(CK_{2\delta-1}, \varphi_\delta) + \\ V_0(CK_{2\delta}, \varphi_\delta) \leq H_\delta \end{pmatrix} \wedge \begin{pmatrix} (V_0(CK_{2\delta}, \varphi_\delta) \leq G_\delta) \vee \\ (V_0(CK_{2\delta}, \varphi_\delta) = 0) \end{pmatrix} \\ V_0(CK_{2k-1}, \varphi_k) = \frac{\varpi \times f_{dtk}}{f_{dt1}}, \mu_k \leq (CK_{2k}, \varphi_k) \leq \frac{(\varpi \times f_{dtk})}{(f_{pm} \times f_{dt1})} \times \sum_{i=1}^{k-1} f_{dti} \end{cases} \quad (6)$$

where $\overline{\omega} \in [A, B]$. Then, based on the PN model shown in FIG. 5, we present the following scheduling algorithm.

Algorithm 6: Suppose that: 1) a refinery has k (>2) distillers $DT_1$-$DT_k$ with flow rates $f_{dt1}$-$f_{dtk}$, and $\mu = \Omega \times (f_{dt1} + f_{dt2} + \ldots + f_{dtk})$, $\mu_1 = \Omega \times f_{dt1}$, $\mu_2 = \Omega \times f_{dt2}$, ..., $\mu_k = \Omega \times f_{dtk}$, and $f_{dtmin} = \min\{f_{dt\delta}\}$, $\delta \in \mathbb{N}_k$; 2) the pipeline has a maximal flow rate $f_{pm} = f_{dt1} + f_{dt2} + \ldots + f_{dtk}$; 2k charging tanks $CK_1$-$CK_{2k}$ are available and their capacity is $Cap_1$-$Cap_{2k}$; 4) $CK_{2\delta-1}$ and $CK_{2\delta}$ are used for feeding $DT_\delta$ with $Cap_{2\delta-1} \geq f_{dt\delta}/f_{dtmin} \times \mu$ and $Cap_{2\delta} \geq f_{dt\delta}/f_{dtmin} \times \mu$, $\delta \in \mathbb{N}_k$; 5) in the scheduling horizon, k types of crude oil with colors $\varphi_1$-$\varphi_k$ are processed by $DT_1$-$DT_k$, respectively; 6) initially, $CK_1$ is empty and starts to be charged by the pipeline; and $CK_2$ with $V_0(CK_2, \varphi_1)$ is feeding $DT_1$; $CK_{2\delta}$ with $V_0(CK_{2\delta}, \varphi_\delta)$ of oil in it is feeding $DT_\delta$, and there is $V_0(CK_{2\delta-1}, \varphi_\delta)$ of oil in $CK_{2\delta-1}$, $\delta \in \mathbb{N}_{k-1} \setminus \{1\}$; $CK_{2k-1}$ has just finished its charging process with $V_0(CK_{2k-1}, \varphi_k)$ of oil and $CK_{2k}$ with $V_0(CK_{2k}, \varphi_k)$ of oil in it is feeding $DT_k$. Then, the system can be scheduled as follows.

1. For the pipeline, during the scheduling horizon, the following operations are sequentially performed:
   1.1. The pipeline starts feeding $CK_1$ with volume $\overline{\omega}$ of oil type #1 and flow rate $f_{pm}$, and go to the next step.
   1.2. If $V_0(CK_3, \varphi_2) = 0$, the pipeline starts feeding $CK_3$ with volume $f_{dt2}/f_{dt1} \times \overline{\omega}$ of oil type #2 and flow rate $f_{pm}$, and go to the next step; otherwise, the pipeline starts feeding $CK_4$ with volume $f_{dt2}/f_{dt1} \times \overline{\omega}$ of oil type #2 and flow rate $f_{pm}$, and go to the next step.
   1.3. If $V_0(CK_5, \varphi_3) = 0$, the pipeline starts feeding $CK_5$ with volume $f_{dt3}/f_{dt1} \times \overline{\omega}$ of oil type #3 and flow rate $f_{pm}$, and go to the next step; otherwise, the pipeline starts feeding $CK_6$ with volume $f_{dt3}/f_{dt1} \times \overline{\omega}$ of oil type #3 and flow rate $f_{pm}$, and go to the next step.
   1.(k−1). If $V_0(CK_{2(k-1)-1}, \varphi_{k-1}) = 0$, the pipeline starts feeding $CK_{2(k-1)-1}$ with volume $f_{dt(k-1)}/f_{dt1} \times \overline{\omega}$ of oil type #(k−1) and flow rate $f_{pm}$, and go to the next step; otherwise, the pipeline starts feeding $CK_{2(k-1)}$ with volume $f_{dt(k-1)}/f_{dt1} \times \overline{\omega}$ of oil type #(k−1) and flow rate $f_{pm}$, and go to the next step.
   1.k. The pipeline starts feeding $CK_{2k}$ with volume $f_{dtk}/f_{dt1} \times \overline{\omega}$ of oil type #k and flow rate $f_{pm}$, and go to the next step.
   1.(k+1). The pipeline starts feeding $CK_2$ with volume $\overline{\omega}$ of oil type #1 and flow rate $f_{pm}$, and go to the next step.
   1.(k+2). If $V_0(CK_3, \varphi_2) = 0$, the pipeline starts feeding $CK_4$ with volume $f_{dt2}/f_{dt1} \times \overline{\omega}$ of oil type #2 and flow rate $f_{pm}$, and go to the next step; otherwise, the pipeline starts feeding $CK_3$ with volume $f_{dt2}/f_{dt1} \times \overline{\omega}$ of oil type #2 and flow rate $f_{pm}$, and go to the next step.
   1.(k+3). If $V_0(CK_5, \varphi_3) = 0$, the pipeline starts feeding $CK_6$ with volume $f_{dt3}/f_{dt1} \times \overline{\omega}$ of oil type #3 and flow rate $f_{pm}$, and go to the next step; otherwise, the pipeline starts feeding $CK_5$ with volume $f_{dt3}/f_{dt1} \times \overline{\omega}$ of oil type #3 and flow rate $f_{pm}$, and go to the next step.
   1.(2k−1). If $V_0(CK_{2(k-1)-1}, \varphi_{k-1}) = 0$, the pipeline starts feeding $CK_{2(k-1)}$ with volume $f_{dt(k-1)}/f_{dt1} \times \overline{\omega}$ of oil type #(k−1) and flow rate $f_{pm}$, and go to the next step; otherwise, the pipeline starts feeding $CK_{2(k-1)-1}$ with volume $f_{dt(k-1)}/f_{dt1} \times \overline{\omega}$ of oil type #(k−1) and flow rate $f_{pm}$, and go to the next step.
   1.2k. The pipeline starts feeding $CK_{2k-1}$ with volume $f_{dtk}/f_{dt1} \times \overline{\omega}$ of oil type #k and flow rate $f_{pm}$, and go to Step 1.1.

2. For $DT_\delta$, $\delta \in \mathbb{N}_k$, during the scheduling horizon, the following operations are sequentially performed:
   2.1. At the beginning, $CK_{2\delta}$ is used to feed $DT_\delta$ until it is empty, and go to Step 2.2.
   2.2. $CK_{2\delta-1}$ is used to feed $DT_\delta$ until it is empty, and go to Step 2.1.

The schedule obtained by Algorithm 6 is feasible.

Algorithm 6 is the extension of Algorithm 3. In summary, for a refinery with two or more distillers, if there are two charging tanks for a distiller, a feasible schedule can be found to achieve the maximal productivity. It can be easily shown that, with less charging tanks than the required number here, no feasible schedule can be found, due to the oil residency time constraints and the uninterrupted operation requirement for a distiller. Thus, by the obtained results, we present the least number of charging tanks for a distiller to find a maximal-productivity feasible schedule. This is a significant advancement in this research field.

By the presented scheduling method, it requires that initially the oil in the charging tanks should be in a given range. In practice, at the beginning of a scheduling horizon, there must be oil in the charging tanks, otherwise no feasible schedule can be found even though there are sufficient charging tanks. Thus, the conditions for the lower bound requirements can be always satisfied. When the oil in some charging tanks exceeds the upper bound, we can control the pipeline to be idle for some time such that the initial state to be the given range. Furthermore, in practice, often a refinery operates under a state such that the productivity is little lower than the maximal flow rate of the pipeline. In this case, there is more flexibility for realizing the proposed scheduling method. Hence, the initial state requirements do not hinder the application of the proposed method in practice.

One of the requirements in the proposed scheduling method is that, during the entire scheduling horizon, each distiller processes one type of crude oil only. This requirement is made to ease the presentation of the proposed results. In fact, whenever a charging tank is charged, another type of oil can be charged into it such that a distiller is switched to process another type of oil. The problem is that, by the proposed method for the case with two charging tanks for a distiller, every time $CK_i$ is charged for feeding $DT_j$, it is charged with the same volume, say $\omega_j$. However, in some cases, after $\xi < \omega_j$ of oil type d is processed by $DT_j$, it should process oil type h, which cannot be realized by the proposed method due to the insufficiency of charging tanks. Note that the goal of this work is to present the least number of charging tanks for scheduling the system and it is successfully done. In practice, often there are more charging tanks than the required one for the proposed method. In fact, if there is one more charging tank in the system, the above scheduling requirement can be realized based on the proposed method.

Note that, by the proposed method, a detailed schedule can be easily obtained without involving complex computation. Thus, based on the proposed method, given a realizable refining schedule, a detailed schedule can be efficiently obtained.

To demonstrate the application of the proposed method, the abovementioned algorithms were utilized in a real world industrial scenario, namely a refinery in China. In the refinery, there are three distillers $DT_1$-$DT_3$ and a schedule is presented every 10 days (i.e. there is a ten-day scheduling horizon).

Figure 8:
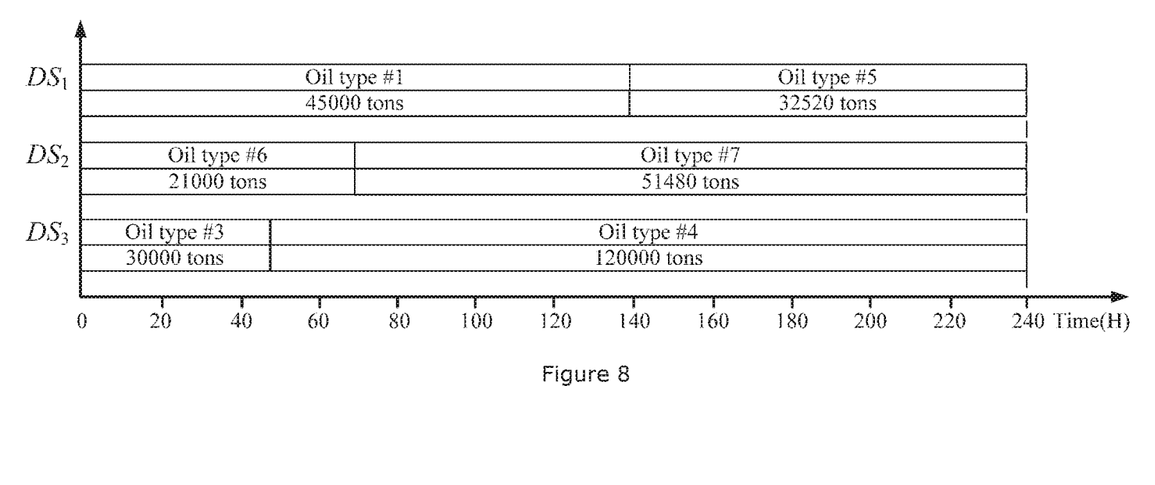
FIG. 8 is a diagram illustrating a refining schedule in accordance with an embodiment of the invention.

Based on a production plan and market demands, the refinery is required to meet the refining schedule shown in FIG. 8. For this refining schedule, the oil feeding rates are $f_{dt1}$=323 tons/h, $f_{dt2}$=302 tons/h, and $f_{dt3}$=625 tons/h, respectively. The maximal flow rate of the pipeline is $f_{pm}$=1250 tons/h such that we have $f_{pm}=f_{dt1}+f_{dt2}+f_{dt3}$. The oil residency time for a tank is 6 hours, or $\Omega$=6 h.

TABLE 1

The oil types and their volumes initially in the charging tanks

| Tank | Capacity (Ton) | Type of oil filled | Volume (Ton) |
|---|---|---|---|
| $CK_1$ | 16000 | Oil #8 | 16000 |
| $CK_2$ | 16000 | Oil #1 | 8000 |
| $CK_3$ | 16000 | Oil #1 | 16000 |
| $CK_4$ | 16000 | Oil #6 | 5000 |
| $CK_5$ | 16000 | | |
| $CK_6$ | 16000 | Oil #6 | 16000 |
| $CK_7$ | 30000 | Oil #3 | 30000 |
| $CK_8$ | 30000 | Oil #2 | 16000 |
| $CK_9$ | 30000 | | |
| $CK_{10}$ | 16000 | | |

There are 10 charging tanks in the refinery and the oil types and volumes initially in the charging tanks are shown in Table 1. There is 12,000 tons of oil type #4 in the pipeline. In an initial state, $CK_2$, $CK_6$, and $CK_7$ are feeding $DT_1$, $DT_2$, and $DT_3$, respectively. Also, it is planned that after the oil in $CK_4$ is used up, maintenance should be performed for $CK_4$. Also, it is known that there is enough oil of type #1, #7, and #4 in the storage tanks.

It follows from the above initial state and the given refining schedule that the oil in charging tanks $CK_1$ and $CK_8$ is not processed during the scheduling horizon. Furthermore, $CK_4$ is planned to be maintained. Thus, during the scheduling horizon, only seven charging tanks are usable, i.e., the condition that it needs three charging tanks for a distiller is not satisfied. Then, the proposed method is used to schedule the system.

Based on the proposed method, charging tanks are assigned to serve for different distiller and determine the oil volume to be charged when a charging tank is charged. With $DT_1$, $DT_2$, and $DT_3$ being initially fed by $CK_2$, $CK_6$, and $CK_7$, respectively, and the oil in the charging tanks, $CK_2$ and $CK_3$ are assigned to $DT_1$, $CK_4$, $CK_5$, and $CK_6$ are assigned to $DT_2$, and $CK_7$ and $CK_9$ are assigned to $DT_3$. Note that, since $CK_4$ should be maintained, only two charging tanks are assigned to $DT_2$. With the aforementioned charging tank assignment, $CK_{10}$ is used to serve for an oil type switch when necessary.

Then, using Theorem 6 to schedule the system, A=max $\{f_{dt1}/f_{dt\delta} \times \mu | \delta \in \mathbb{N}_3\}$=8021.52 tons and B=min$\{Cap_2, Cap_3, f_{dt1}/f_{dt2} \times Cap_5, f_{dt1}/f_{dt2} \times Cap_6, f_{dt1}/f_{dt3} \times Cap_7, f_{dt1}/f_{dt3} \times Cap_9\}$=15504 tons. To reduce the number of switches in feeding distillers, we let $\overline{\omega}$=B=15504 tons. It can be verified that the oil initially in the charging tanks satisfies Condition 6. Then, according to the proposed method, to schedule the system, one needs to alternately use $CK_2$ and $CK_3$ to feed $DT_1$, $CK_6$ and $CK_4$, and then $CK_5$ and $CK_6$ to feed $DT_2$, and $CK_7$ and $CK_9$ to feed $DT_3$.

Also, at the same time, when $CK_2$ or $CK_3$ is charged, it is charged with $V_1=\overline{\omega}$=15504 tons of oil; when $CK_5$ or $CK_6$ is charged, it is charged with $V_2=\overline{\omega}=f_{dt2}/f_{dt1}$=14,496 tons of oil; and when $CK_7$ or $CK_9$ is charged, it is charged with $V_3=\overline{\omega} \times f_{dt3}/f_{dt1}$=30,000 tons of oil. Note that, using such a schedule, $CK_7$ and $CK_9$ can be charged to capacity, while the others can be charged to more than 90% of capacity.

Figure 9:
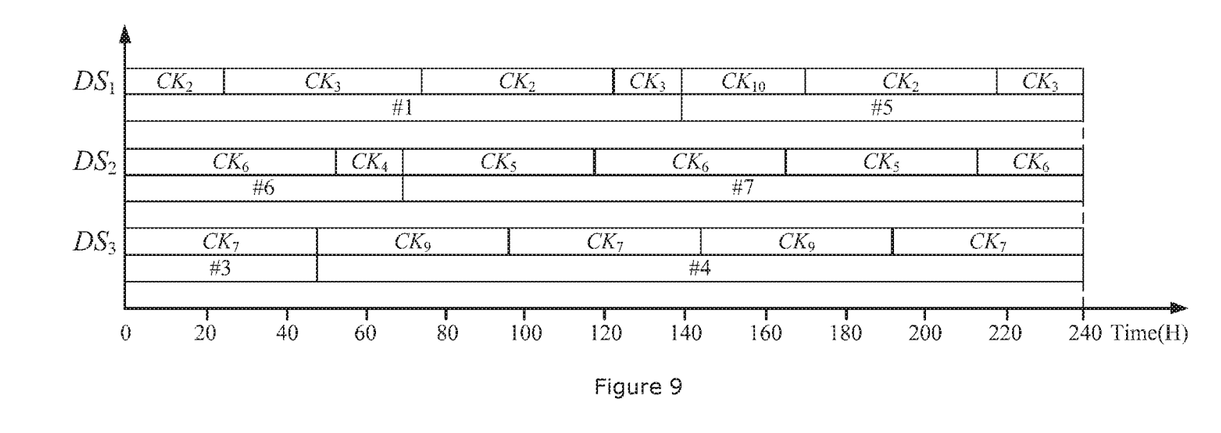
FIG. 9 is a diagram illustrating a detailed distiller feeding schedule in accordance with an embodiment of the invention.
Figure 10:
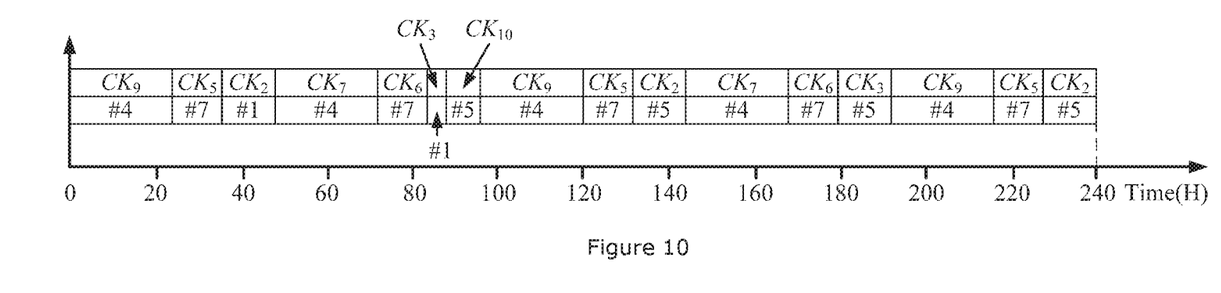
FIG. 10 is a diagram illustrating a detailed schedule for delivering oil to charging tanks in accordance with an embodiment of the invention.

During the scheduling, it is necessary to determine whether the required volume of oil can be switched from one oil type to another. In this case, after processing 45,000 tons of oil type #1, the system needs to process oil type #5. Thus, according to the scheduling method, when $CK_3$ is charged for the first time, we can charge 5496 tons of oil type #1, which is less than $V_1$=15504. To solve this problem, after charging 5496 tons of oil type #1 into $CK_3$, 10,008 tons of oil type #5 is charged into $CK_{10}$. By taking this step, a feasible schedule with maximal productivity is determined. The relevant Gantt charts are shown in FIGS. 9 and 10. The Gantt chart in FIG. 9 presents the detailed distiller feeding schedule for each distiller, while the chart in FIG. 10 gives the detailed schedule for delivering oil to the charging tanks.

In the known art, it is extremely difficult or even impossible to obtain a detailed short-term schedule for such a real-life application problem. Utilising the algorithms described above, when encoded in software, a detailed feasible schedule can be easily found to realize a given refining schedule. This may be implemented as a system, which in turn controls electronically controlled components of an oil refinery system.

Conventional techniques require three charging tanks for feeding a distiller, which cannot always be satisfied in real-life cases, especially when some charging tanks are undergoing maintenance and/or the production capacity of the refinery is extended. To cope with this problem, the algorithms encoded into the system described herein relax this restriction, where feasible.

By using a hybrid Petri net model encoded into software, a feasible schedule can be found if there are two charging tanks for a distiller in a computationally efficient manner. This provides a significant advancement in the ability of refineries to schedule production, tank filling and many other aspects of their operation. Moreover, the system does not require any user intervention, as the calculation is automatic and does not rely on specific user input or decision making.

Throughout this specification, unless the context requires otherwise, the word "comprise" or variations such as "comprises" or "comprising", will be understood to imply the inclusion of a stated integer or group of integers but not the exclusion of any other integer or group of integers.

Those skilled in the art will appreciate that the invention described herein is susceptible to variations and modifications other than those specifically described. The invention includes all such variation and modifications. The invention also includes all of the steps, features, formulations and compounds referred to or indicated in the specification, individually or collectively and any and all combinations or any two or more of the steps or features.

Definitions for selected terms used herein may be found within the detailed description of the specification and apply throughout. Unless otherwise defined, all other scientific and technical terms used herein have the same meaning as commonly understood to one of ordinary skill in the art to which the invention belongs.

Although not required, the embodiments described with reference to the method, computer program, data signal and aspects of the system can be implemented via an application programming interface (API), an application development kit (ADK) or as a series of program libraries, for use by a developer, for the creation of software applications which are to be used on any one or more computing platforms or devices, such as a terminal or personal computer operating system or a portable computing device, such as a smartphone or a tablet computing system operating system, or within a larger server structure, such as a 'data farm' or within a larger transaction processing system.

Generally, as program modules include routines, programs, objects, components and data files that perform or assist in the performance of particular functions, it will be understood that the functionality of the software application may be distributed across a number of routines, programs, objects or components to achieve the same functionality as the embodiment and the broader invention claimed herein. Such variations and modifications are within the purview of those skilled in the art.

It will also be appreciated that where methods and systems of the present invention and/or embodiments are implemented by computing systems or partly implemented by computing systems then any appropriate computing system architecture may be utilised. This includes standalone computers, network computers and dedicated computing devices (such as field-programmable gate arrays).

Where the terms "computer", "computing system" and "computing device" are used in the specification, these terms are intended to cover any appropriate arrangement of computer hardware for implementing the inventive concept and/or embodiments described herein.

Where the terms "scheduling system", "autonomous device" and "smart device" are used in the specification, these terms are intended to cover any appropriate device which is capable of receiving a command and utilising the command to perform a function, which may be either a "physical" function (i.e. movement) or a "virtual" function (e.g. interact with another device via electronic commands).

Where reference is made to cloud computing, the term refers to Internet-based computing, wherein shared resources, software, and/or information are provided to one or more computing devices on-demand via the Internet (or other communications network).

Where reference is made to communication standards, methods and/or systems/devices may transmit and receive data via a variety of forms: 3G, 4G (CDMA/GSM), Wi-Fi, Bluetooth, other radio frequency, optical, acoustic, magnetic, GPS/GPRS, or any other form or method of communication that may become available from time to time.

The invention claimed is:

1. A computer-implemented method for operating an oil refinery, the oil refinery having a plurality of storage tanks and at least two distillers, the at least two distillers including first and second distillers each having only two charging tanks, the charging tanks being operably connected with the storage tanks using one or more pipelines, the computer-implemented method comprising: receiving, at one or more processors, data regarding a plurality of operation decisions of operations of an oil refinery; modeling, at the one or more processors, using the received data and a hybrid discrete-continuous Petri-Net model, the storage tanks, the charging tanks, and the one or more pipelines of the oil refinery and the operations of the oil refinery, the hybrid discrete-continuous Petri-Net model models the initial conditions of the charging tanks of the first and second distillers as follows: a first charging tank of the first distiller is feeding a first type of oil to the first distiller, a first charging tank of the second distiller is feeding the first type of oil to the second distiller, a second charging tank of the first distiller is empty and is ready for charging with a second type of oil, and a second charging tank of the second distiller has been charged with the second type of oil; determining, at the one or more processors, based on the model, an optimized schedule of operations of the oil refinery for maximum productivity; and controlling, by the one or more processors, operation of electronically operated devices of the oil refinery based on the determined optimized schedule, the electronically operated devices being operably connected with the one or more processors; and wherein the total number of distillers is K, the total number of charging tanks is 2K, and K is equal to or larger than 2, and each distiller has only two charging tanks.

2. The computer-implemented method of claim 1, wherein the hybrid discrete-continuous Petri net model is arranged to model each of the storage tanks and the charging tanks using: a continuous place ps to model a state of a tank; a continuous place p, to model a state of the tank; a continuous place p1 to model the capacity of the tank; and continuous transitions tf and t to model the charging and discharging of the tank.

3. The computer-implemented method of claim 2, wherein the hybrid discrete-continuous Petri net model is arranged to model the pipeline using: continuous places pi to p3 to model segments in a pipeline; transitions to to trk to model oil charging into a pipeline from different storage tanks, where k belongs to any integer larger than 1; and transitions toi to tok to model oil charging into different charging tanks from the pipeline, where k belongs to any integer larger than 1.

4. The computer-implemented method of claim 1, wherein the determined optimized schedule is in the form of a Gantt chart.

5. The computer-implemented method of claim 1, wherein the determined optimized schedule comprises a distiller feeding schedule.

6. The computer-implemented method of claim 1, wherein the determined optimized schedule comprises a schedule for delivering oil to the charging tanks.

7. The computer-implemented method of claim 1, further comprising: outputting, by the one or more processors, the determined optimized schedule for display.

8. A system for operating an oil refinery, the oil refinery having a plurality of storage tanks and at least two distillers, the at least two distillers including first and second distillers each having only two charging tanks, the charging tanks being operably connected with the storage tanks using one or more pipelines, the system comprising one or more processors configured to: receive data regarding a plurality of operation decisions of operations of an oil refinery; model, using the received data and a hybrid discrete-continuous Petri-Net model, the storage tanks, the charging tanks, and the one or more pipelines of the oil refinery and the operations of the oil refinery, the hybrid discrete-continuous Petri-Net model models the initial conditions of the charging tanks of the first and second distillers as follows: a first charging tank of the first distiller is feeding a first type of oil to the first distiller, a first charging tank of the second distiller is feeding the first type of oil to the second distiller, a second charging tank of the first distiller is empty and ready for charging with a second type of oil, and a second charging tank of the second distiller has been charged with the second type of oil; determine, based on the model, an optimized schedule of operations of the oil refinery for maximum productivity; control operation of electronically operated devices of the oil refinery based on the determined optimized schedule, the electronically operated devices being operable connected with the one or more processors; wherein the number of distillers is K, the number of charging tanks is 2K, and K is equal to or larger than 2, and each distiller has only two charging tanks.

9. The system of claim 8, wherein the hybrid discrete-continuous Petri net model is arranged to model each of the storage tanks and the charging tanks using: a continuous place ps to model a state of a tank; a continuous place p, to model a state of the tank; a continuous place p1 to model the capacity of the tank; and continuous transitions tf and t to model the charging and discharging of the tank.

10. The system of claim 9, wherein the hybrid discrete-continuous Petri net model is arranged to model the pipeline using: continuous places pi to p3 to model segments in a pipeline; transitions tii to t k to model oil charging into a pipeline from different storage tanks, where k belongs to any integer larger than 1; and transitions toi to tok to model oil charging into different charging tanks from the pipeline, where k belongs to any integer larger than 1.

11. The system of claim 8, wherein the determined optimized schedule is in the form of a Gantt chart.

12. The system of claim 8, wherein the determined optimized schedule comprises a distiller feeding schedule.

13. The system of claim 8, wherein the determined optimized schedule comprises a schedule for delivering oil to the charging tanks.

14. The system of claim 8, wherein the one or more processors are further arranged to: output the determined optimized schedule for display.

* * * * *